United States Patent
Jebens et al.

(10) Patent No.: US 6,332,146 B1
(45) Date of Patent: Dec. 18, 2001

(54) METHOD AND APPARATUS FOR STORING AND PRINTING DIGITAL IMAGES

(75) Inventors: John H. Jebens, Tierra Verde, FL (US); Jeffrey Scott James, Bettendorf, IA (US); Lowell D. Carlson, Moline, IL (US)

(73) Assignee: Marshall, O'Toole, Gerstein, Murray & Borun, Chicago, IL (US)

( * ) Notice: Subject to any disclaimer, the term of this patent is extended or adjusted under 35 U.S.C. 154(b) by 0 days.

(21) Appl. No.: 09/619,188

(22) Filed: Jul. 19, 2000

Related U.S. Application Data

(63) Continuation of application No. 08/908,046, filed on Aug. 11, 1997.

(51) Int. Cl.[7] .................................................. G06F 17/30
(52) U.S. Cl. ................... 707/104; 707/3; 707/10; 707/102; 705/26; 705/27; 345/428
(58) Field of Search ................... 707/3, 10, 102, 707/104, 530; 705/27, 33, 42, 26; 345/132, 302, 418, 428; 382/284, 276, 249; 386/124; 355/40, 70; 396/639

(56) References Cited

U.S. PATENT DOCUMENTS

| | | | |
|---|---|---|---|
| 4,495,582 | 1/1985 | Dessert et al. ......................... 700/124 |
| 4,688,181 | 8/1987 | Cottrell et al. ........................ 345/428 |
| 4,799,156 | 1/1989 | Shavit et al. ........................... 705/26 |
| 4,933,880 | 6/1990 | Borgendale et al. ................. 707/515 |
| 4,956,769 | 9/1990 | Smith ...................................... 707/9 |
| 4,992,940 | 2/1991 | Dworkin ................................ 705/26 |
| 5,065,447 | 11/1991 | Barnsley et al. ...................... 382/249 |
| 5,144,556 | 9/1992 | Wang et al. ............................. 707/9 |
| 5,153,936 | 10/1992 | Morris et al. ......................... 345/428 |
| 5,263,157 | 11/1993 | Janis ........................................ 707/9 |
| 5,276,901 | 1/1994 | Howell et al. ........................... 707/9 |
| 5,315,693 | 5/1994 | Hirosawa .............................. 345/428 |
| 5,319,401 | * 6/1994 | Hicks ..................................... 354/76 |
| 5,319,543 | 6/1994 | Wihhelm ................................. 705/3 |
| 5,414,811 | * 5/1995 | Parluski et al. ...................... 345/501 |

(List continued on next page.)

OTHER PUBLICATIONS

"Japan–Israel venture to offer photo development through Internet", Major Articles, *Nikkel English News*, Nov. 8, 1996.

"Konica Offers On–Line Photo Processing—Only in the US", *Computer International*, No. 2914, May 16, 1996.

"Photofinishing Comes to the Web", *Newsbytes News Network*, Mar. 7, 1996.

"The Internet", *Israel Technology and Investment Letter*, vol. 2, No. 2, Mar. 1, 1996.

Martin, James A., "*Moving Images Without Tears*," Macworld, v12, n12, p. 121 (2), Dec., 1995.

(List continued on next page.)

*Primary Examiner*—Hosain T. Alam
*Assistant Examiner*—Ella Colbert
(74) *Attorney, Agent, or Firm*—Marshall, Gerstein & Borun

(57) ABSTRACT

A digital data management and order delivery system is provided. The system includes a storage device for storing digital data and a searching engine for developing a subset of the digital data stored in the storage device in response to inputs received from a first user. The system is also provided with a job order developer responsive to inputs received from the first user for developing a job order which includes: a) at least one copy of the digital data contained in the subset and identified by the first user; and b) a file containing information developed by the first user outside the system. In addition, the system includes a router for electronically routing the job order compiled by the job order developer to a second user specified by the first user.

25 Claims, 27 Drawing Sheets

U.S. PATENT DOCUMENTS

| | | | |
|---|---|---|---|
| 5,426,594 | 6/1995 | Wright et al. | 709/206 |
| 5,440,401 | 8/1995 | Parulski et al. | 386/124 |
| 5,463,555 | 10/1995 | Ward et al. | 700/96 |
| 5,469,353 | 11/1995 | Pinsky et al. | 382/131 |
| 5,493,677 | 2/1996 | Balogh et al. | 707/104 |
| 5,539,906 | 7/1996 | Abraham et al. | 707/9 |
| 5,553,281 | 9/1996 | Brown et al. | 707/104 |
| 5,581,749 | 12/1996 | Hossain et al. | 707/10 |
| 5,584,022 | 12/1996 | Kikuchi et al. | 707/9 |
| 5,606,365 * | 2/1997 | Maurinus et al. | 348/222 |
| 5,625,776 | 4/1997 | Johnson | 705/27 |
| 5,630,125 | 5/1997 | Zellweger | 707/103 |
| 5,666,215 | 9/1997 | Fredlund et al. | 358/487 |
| 5,696,901 | 12/1997 | Konrad | 709/203 |
| 5,784,461 | 7/1998 | Shaffer et al. | 705/51 |
| 5,845,263 | 11/1999 | Camaisa et al. | 705/27 |
| 5,852,435 | 12/1998 | Vigneaux et al. | 345/302 |
| 5,875,268 | 2/1999 | Miyake | 382/276 |
| 5,978,804 | 11/1999 | Dietzman | 707/10 |
| 6,017,157 | 1/2000 | Garfinkle et al. | 396/639 |
| 6,154,755 * | 11/2000 | Dellert et al. | 707/526 |

OTHER PUBLICATIONS

"Methods For Image Management," (Seybold Special Report, Part II), Seybold Report on Publishing Systems, v24, n18, p. S44 (6), May 15, 1995.

"More Notes From Nexpo: Image Handling, Digital Cameras and Links To Presses; Image Handling: Archiving, Retrieval, Etc.," (Includes A Related Article On Companies Offering Newspapers Pre–Made Comic Pages), Seybold Report on Publishing Systems, v25, n1, p. 28 (11), Sep. 1, 1995.

Richards, Kathleen, "PhotoNet addresses PC photos. (Internet–based service offers high–quality output of photographic material for personal computer users)", The Weekly Newspaper for the Home Furnishing Network, vol. 70, No. 51, Dec. 16, 1996.

Smith, Jeff, "Konica's Photo Service is Going On–Line by May", Business Tuesday, Pulse, Portland Press Herald, Mar. 12, 1996.

Straus et al., "Netw@tch The AJC'S Daily Online Guide Signing on for photos, customers can save trip to camera shop", Features, Atlanta Journal and Constitution, Feb. 20, 1996.

Symons, Allene, Beam me up a phot greeting card, Scotty. (drugstores and electronic on–line photos and cards from Konica and American Greetings), Drug Store News, vol. 18, No. 6, Apr. 1, 1996.

Wildstrom, Stephen H., "Technology & You: Bulletin Board: Snapshots . . . Or Via The Web", Business Week, No. 3497, Oct. 14, 1996.

"Supermarket Photo Service Touts Snapshots on the Net", Interactive Media Briefs, Interactive Marketing News, vol. 3, Issue 35, Dec. 6, 1996.

"PC PICS", Finance, Business Briefcase, Boston Herald, Dec. 4, 1996.

"Photos Over Net", Business, Local, Telegram & Gazette, Worcester, MA, Dec. 4, 1996.

"A CRW Report", News, Computer Retail Week, Dec. 2, 1996.

"Plaza Create to make electronic photo albums", Japan Computer Industry Scan, Nov. 18, 1996.

"Plaza Create enjoys first rise in four days", Tokyo and Osaka Stock Markets, Nikkei English News, Nov. 14, 1996.

"Plaza Create (7502) to sell color printer, digital camera", Major Articles, Nikkei English News, Nov. 13, 1996.

"Telecommunications & Technology: Plaza Create to Form Venture with U.S.", The Wall Street Journal Europe, Nov. 11, 1996.

Baig, Edward C., "Smile—You're on Candid Computer. Software, scanners, and color printers are making digital photography a snap", Business Week, No. 3500, Nov. 4, 1996.

Bounds, Wendy, "Big Photo Retailer to Offer Service on the Internet", Marketing & Media, The Wall Street Journal, Feb. 21, 1996.

Buckler, Grant, "Startup MGI Going After Emerging Photo Software Market", Newsbytes, Nov. 27, 1996.

Elson, Joel, Hannaford, Shaw's see how Internet fits photos. (Hannaford Brothers Co. of Maine; Shaw's Supermarkets Inc. of Massachusetts; Internet use for photo finishing), Supermarket News, vol. 46, No. 47, Nov. 18, 1996.

Lansky, Jerry, "Without APS, Photo Life Goes on Via Internet", Photographic Trade News, Aug. 1, 1996.

Levin et al., "Web Photo Finish; New online services for shutterbugs", vol. 15, No. 19, PC Magazine, Nov. 5, 1996.

Miller, Leslie, "Web posting as a photo processing option", Life, USA Today, Dec. 13, 1996.

O'Neill, Jerry, "Photofinishers Shoot the Curl in Cyberspace", Net Gains, Photographic Trade News, Sep. 1, 1996.

Armstrong, "For This Printer, Scanning's a Snap", Business Week, p. 16, Aug. 11, 1997.

Rowley, "Israeli Firm Puts Photos On–Line", Chicago Tribune, Aug. 6, 1997.

Spinner, "Going With The Flow", CFO, table of contents and pp. 53–57, Aug. 1997.

Capturing & Saving Digital Images.

Manual: Media Assest Management, GISTICS Incorporated, 1997.

Brochure: Media Bank, Digital Asset Management by Archetype.

Brochure: Media Bank, The Power of Digital Asset Management by Archetype.

Brochure: Media Assets 1.6 by Media Way.

Brochure: Job Manager, Information Management System for the Graphic Arts Industry by Meta Communications.

Brochure: Telescope, Client Server Media Management Database by North Plains Systems, Inc.

Brochure: Luminous Media Manager by Luminous Technology Systems, Inc.

Brochure: Luminous Media Manager Background by Luminous Technology Systems, Inc.

Brochure: Destiny, Focusing the Power of Your Digital Information by Centillion Digital Systems.

Brochure: DAX, File Transfer by Digital Art Exchange, Inc.

Brochure: DAX Database Access by Digital Art Exchange, Inc.

Brochure: DAX, Remote Proofing by Digital Art Exchange, Inc.

Brochure: DAX, Computer–to–Plate by Digital Art Exchange, Inc.

Brochure: DAX, Interactive Mark–up by Digital Art Exchange, Inc.

Brochure: Digital Art Exchange, The Connectivity Solution by Digital Art Exchange, Inc.

Brochure: Cascade MediaSphere W3 by Cascade Systems, Inc.

Brochure: Cascade DataFlow by Cascade Systems, Inc.

Brochure: Cascade Product Overview by Cascade Systems, Inc.

Brochure: Cumulus Media Management System 3., by Canto.

Brochure: Hynet Digital Library System, Version 1.5 by Hynet Technologies.

Brochure: Galerie, Media Asset Management by Dalim.

Brochure: Dalim, Twist by Dalim.

Brochure: Cascade MediaSphere by Cascade Systems, Inc.

Brochure: Luminous PrintersWeb by Luminous Technology Corporation.

* cited by examiner

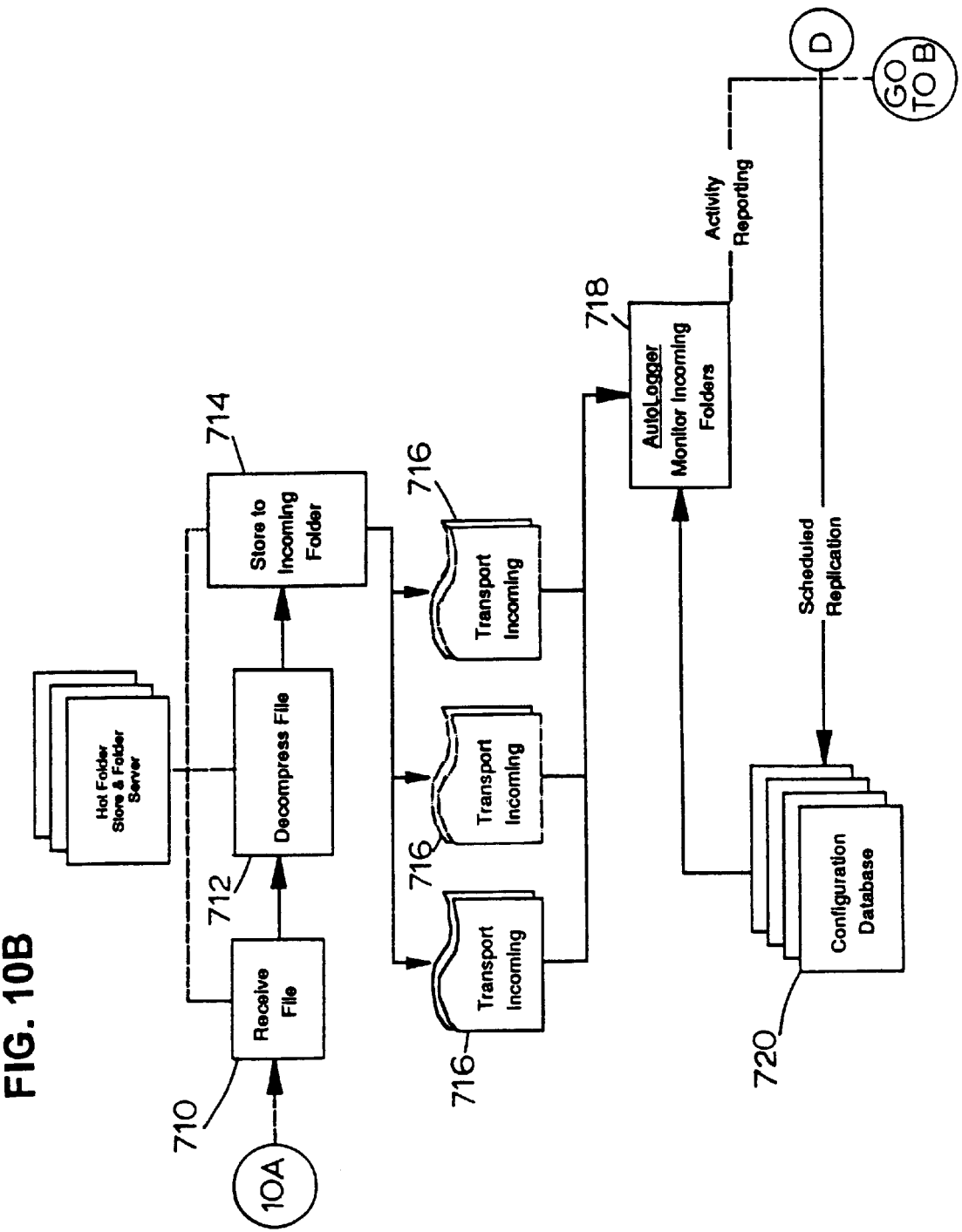

METHOD AND APPARATUS FOR STORING AND PRINTING DIGITAL IMAGES

This is a Continuation of U.S. application Ser. No. 08/908,046, filed Aug. 11, 1997.

FIELD OF THE INVENTION

The present invention relates generally to data management and publishing, and, more particularly, to a data management and order delivery system for providing storage of data such as digital images and for routing and delivering orders incorporating a selected subset of the stored data to a publishing facility or the like.

BACKGROUND OF THE INVENTION

As computers have attained more and more of a prominent role in virtually every aspect of life and every type of business, the need to effectively and efficiently store digital data has intensified. This need is particularly acute in the context of digital images where large amounts of computer memory can be consumed by a single high resolution image. Thus, businesses and the like that frequently develop digital images can find themselves quickly depleting their in-house, on-line storage capabilities for such assets. Businesses in such a position have often reacted by storing these assets off-line, in magnetic or optical storage mediums such as floppy disks and compact disks. In some instances, the digital asset is deleted and retained only in the form of a hard copy, such as a transparency that can be digitized through a scanning process should a future use for the image arise.

While these approaches have alleviated some of the capacity problems associated with storing digital assets, they have suffered from certain deficiencies. For example, off-line storage such as that described above inherently leads to inefficiencies such as administrative costs associated with cataloging digital assets, delays in locating digital data and, in some instances, loss of the asset altogether. Moreover, in those instances where assets are stored in hard copy form as transparencies or the like, re-scanning an image for future use can lead to inefficient redundancies such as repeating digital retouching, image correction, or color correction procedures and the like. Further, the conversion from digital data to hard copy form and back can result in degradation of image quality.

The rapidly increasing value of digitized images has heightened the importance of efficiently and safely storing and managing digital assets. Indeed, the explosive growth of the internet is indicative of an unprecedented demand for digital media assets and the corresponding increased value such assets are presently enjoying.

The advertising and publishing industries are both significantly impacted by the ready accessibility (or lack thereof) of digital images. By way of example, advertising agencies often utilize images of products or the like in the publications they create for their clients. Often these images take the form of photographs or transparencies. To create a distributable product, these agencies often forward the transparencies or photographs to be published to an outside facility for digitizing. After the digital image is created, the outside agency typically stores the data on a floppy disk or the like, and then either ships the digital data to a printer or returns the data to the agency for incorporation in a document to be printed. The printer can then print the desired quantity of the publication.

If, subsequently, the need for additional copies of the publication arises and none of the involved entities has maintained a copy of the digital image, the entire process of shipping the transparencies or photographs to the digitizing facility, scanning the images, and forwarding the re-created digital images to the printer must be repeated. Such a process leads to undesirable costs and possible differences between publication runs due to differences in any corrections or modifications made to the digital image in the two separate digitization processes. These same costs and difficulties can arise in instances where it becomes desirable to re-use a digital asset in a different publication or in a different format altogether (e.g., utilizing an image from a movie in an advertizing brochure).

SUMMARY OF THE INVENTION

The present invention overcomes the drawbacks of the prior art by providing a digital image management and order delivery system. The system is provided with a storage device for storing digital images. It also includes a searching engine for developing a subset of the digital images stored in the storage device in response to inputs received from a first user. The searching engine is adapted to download low resolution copies of the subset to the first user. The system is also provided with a job order developer responsive to inputs received from the first user for developing a job order which includes: a) at least one high resolution copy of a digital image contained in the subset and identified by the first user, and b) a file containing information developed by the first user outside of the system. In addition, the system includes a router for electronically routing the job order developed by the job order developer to a second user specified by the first user.

In some embodiments the system is provided with one or more of the following: an image handler for processing digital images input into the system; a user identifier for discriminating between users communicating with the system to control access to the digital images stored in the storage device; an event tracker for monitoring and recording predefined events occurring in the system; means for developing a charge to be accessed a user for at least one of the events recorded by the event tracker; a communication device for receiving and transmitting data to one or more remote users; and means for developing miniaturized depictions of the subset developed by the searching engine. In some preferred embodiments, the file in the job order developed by the job order developer defines a document to be printed; the second user is a printer; and the at least one high resolution image is to be printed as part of the document.

Further, any of the foregoing embodiments can be provided with means for receiving digital data from a data provider user to be stored in the storage device; and, means for compressing the digital data received by the receiving means in accordance with a parameter set by the data provider user. In some embodiments, the parameter defines a compression format to be employed by the compressing means. In others, the parameter defines a degree of compression to be employed by the compressing means. Any of the foregoing embodiments can be provided with means for developing an indication of a charge to be assessed the data provider user for storing the digital data in the storage device. In instances where such a charge developing means is provided, it can develop a charge based on the amount of storage memory utilized by the digital data; based on the amount of time the digital data is stored in the storage device; or both.

A method of managing digital images is also provided to overcome the drawbacks of the prior art. The method comprises the steps of: storing a high resolution and a low resolution copy of each of a plurality of digital images in an electronically searchable format; permitting a first user to locate and download a low resolution copy of at least one of the digital images; receiving an electronic file defining a document from the first user, the document being designed to incorporate the at least one digital image and data developed outside of the system; receiving instructions from the first user directing that the electronic file be delivered to a second user; and, automatically routing the electronic file and a high resolution copy of the at least one digital image to the second user identified by the first user for publication.

The noted deficiencies of the prior art are also overcome by providing a data management system of the following type. Such a data management system includes means for storing first and second sets of data. Each of the first sets of data has a first bandwidth communication requirement. Each of the second sets of data is representative of an associated one of the first sets of data and has a second bandwidth communication requirement less than the first bandwidth communication requirement. The system also includes means for allowing a user to download a particular second set of data from the storing means and means for accepting a work order from a first location wherein the work order identifies the particular second set of data and includes further data developed outside the system. The system is also provided with means for electronically routing a job order to a second location, and means for downloading the first set of data associated with the second set of data to the second location.

Pursuant to another important aspect of the invention, a digital data storage facility for providing storage for a plurality of third party users is provided. The storage facility is provided with a storage device; means for receiving digital data from a user in the plurality; means for compressing the digital data received by the receiving means in accordance with a parameter set by the user; and, means for storing the digital data compressed by the compressing means in the storage device. In certain preferred embodiments, the parameter defines a compression format to be employed by the compressing means. In other embodiments, the parameter defines a degree of compression to be employed by the compressing means. In any of these embodiments, the storage facility may be provided with means for developing an indication of a charge to be assessed the user for storing the digital data in the storage device. The charge developing means may develop charges based on the amount of storage memory utilized by the digital data; on the amount of time the digital data is stored in the storage device; or both.

The deficiencies of the prior art are also overcome by providing a digital data management and order delivery system of the following type. Such a system includes a storage device for storing digital data; a searching engine for developing a subset of the digital data stored in the storage device in response to inputs received from a first user; a job order developer for receiving a work order from the first user and for developing a job order based on the work order; and, a router for electronically routing the job order developed by the job order developer to a second user specified by the first user. In some embodiments the work order includes a file containing information developed by the first user outside of the system and the job order includes the file. The file may comprises a page description language file. In any of the foregoing embodiments, the work order can identify digital data contained in the subset and the job order can include the digital data identified in the work order.

The present invention also overcomes drawbacks of the prior art by providing a data management system comprising a host server, and a remote server in selective communication with the host server. The remote server includes means for requesting a first set of data from the host server and means responsive to the requesting means for developing a second set of data defining instructions and identifying a third set of data corresponding to the first set of data. The host server includes means for developing a fourth set of data in accordance with the instructions in the second set and means for routing the fourth set of data to a jobber. In some embodiments, the second set of data includes a page description language file; the first set of data comprises a low resolution image, and the third set of data includes a high resolution image corresponding to the low resolution image; and/or, the host server, the remote server and the job are interconnected via a network. In any of the foregoing embodiments, the third set of data can be the first set of data and/or the second set of data can include the first set of data.

BRIEF DESCRIPTION OF TEE DRAWINGS

Figure 1:
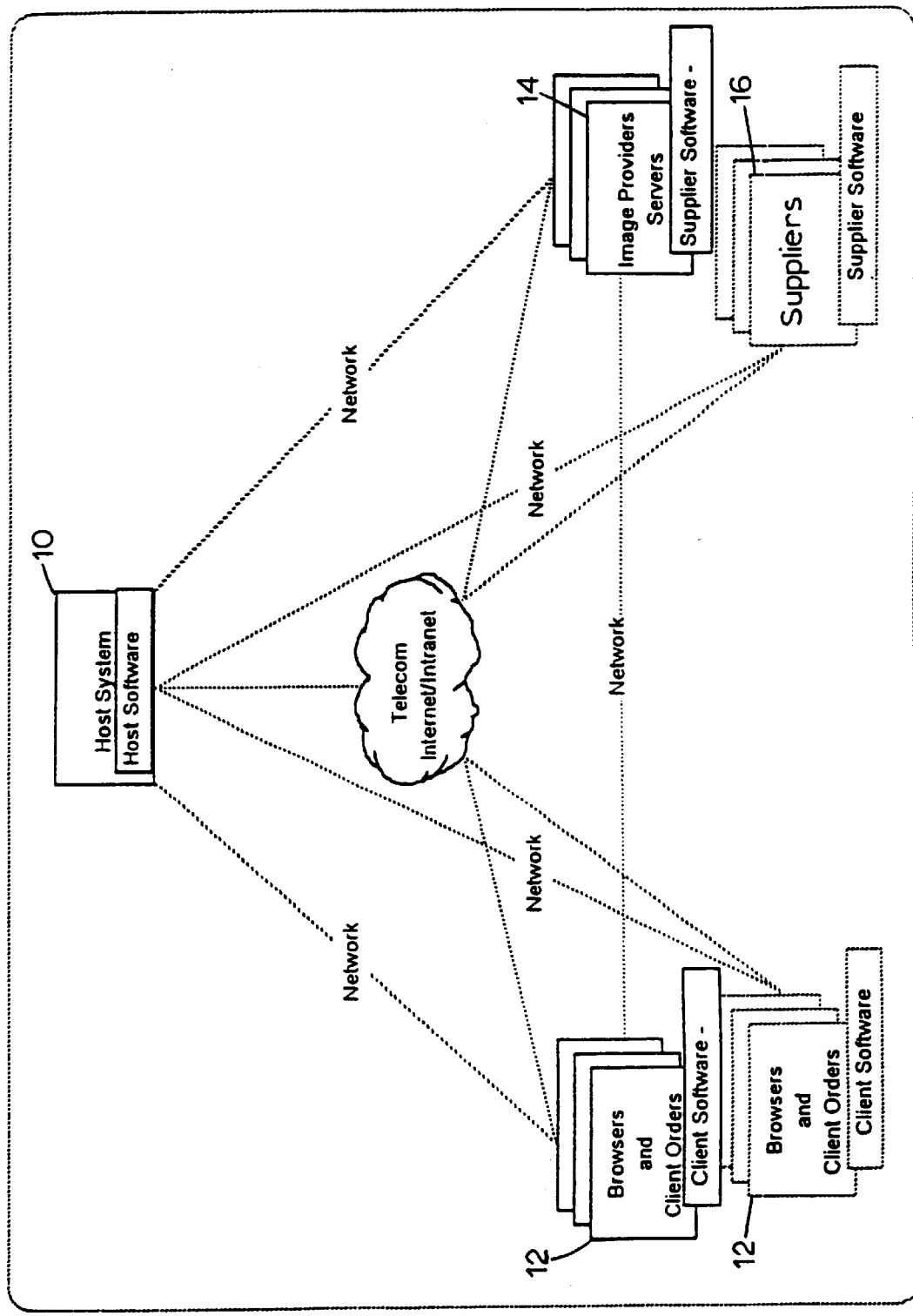
FIG. 1 illustrates generally a data management and work order delivery system constructed in accordance with the teachings of the present invention and shown in one possible environment of use.
Figure 3A:
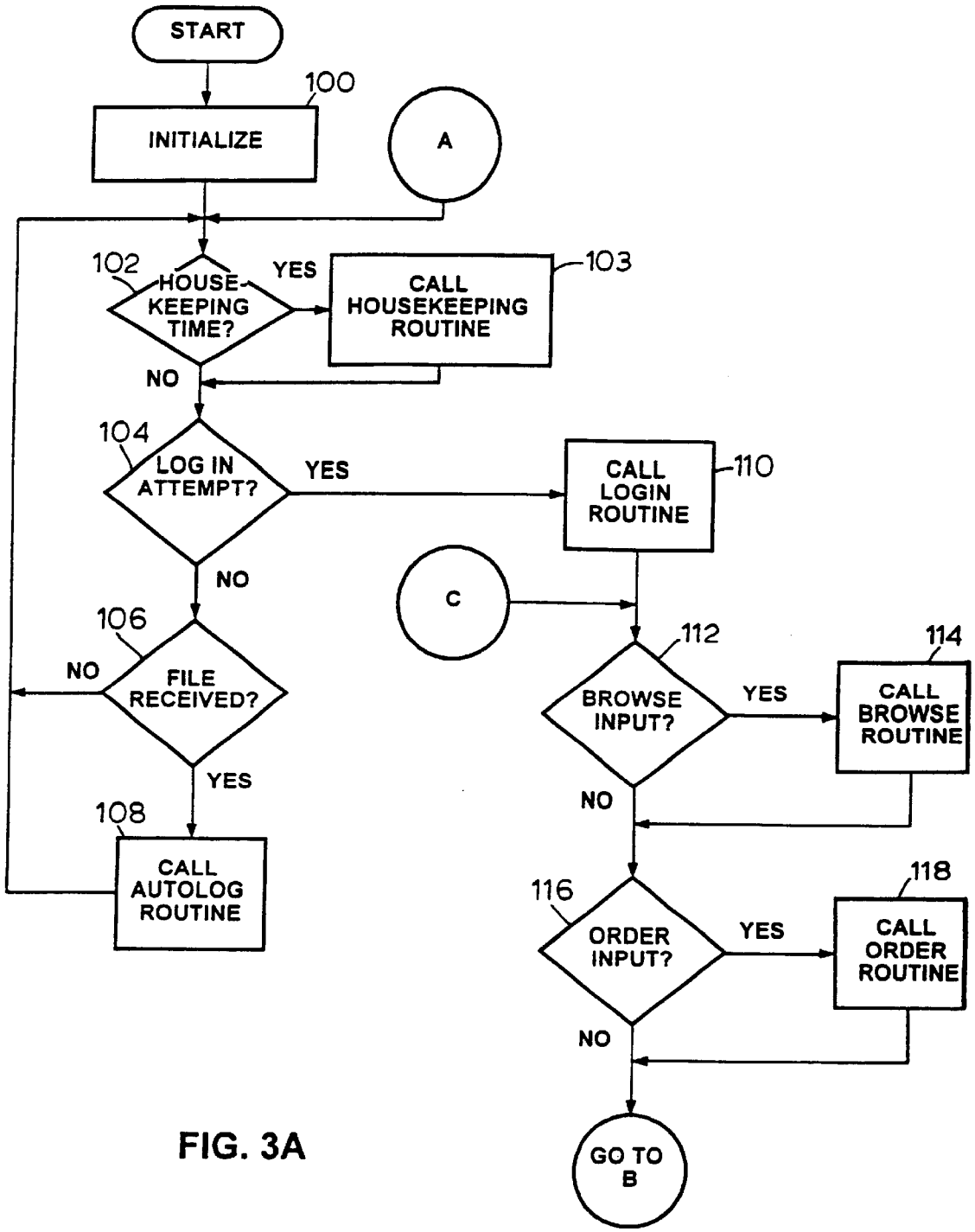
Figure 3B:
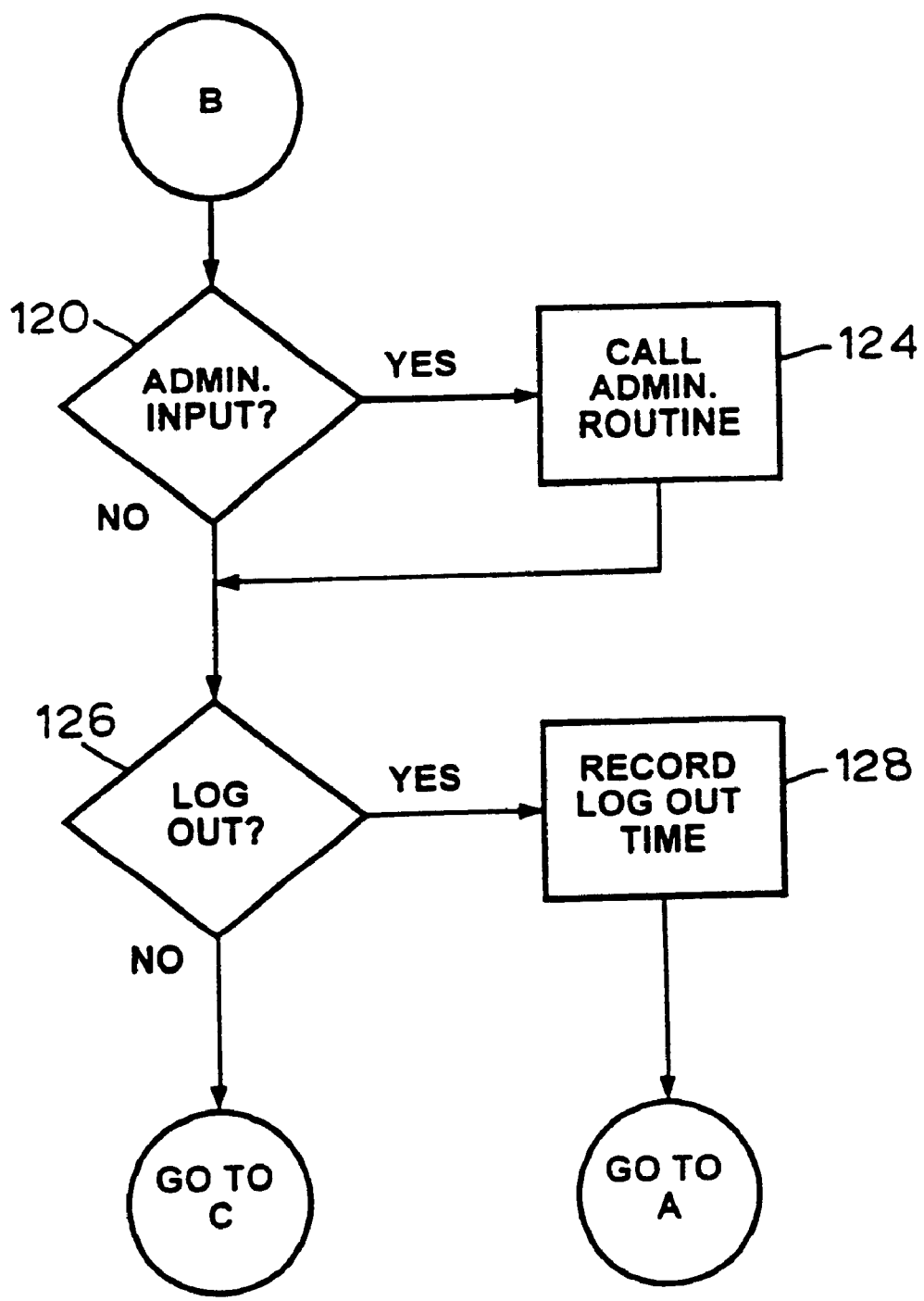

FIGS. 3A–3B together comprise flow charts illustrating the overall operation of the system of FIG. 1.

Figure 4A:
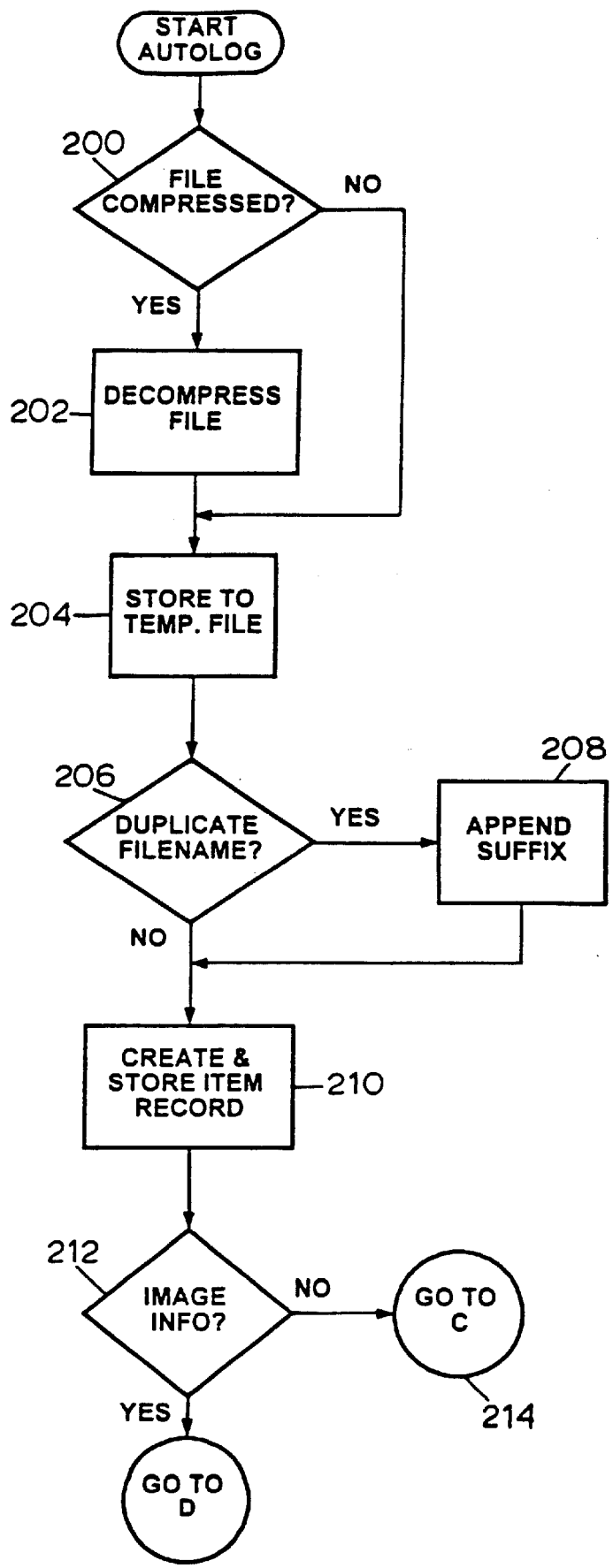
Figure 4B:
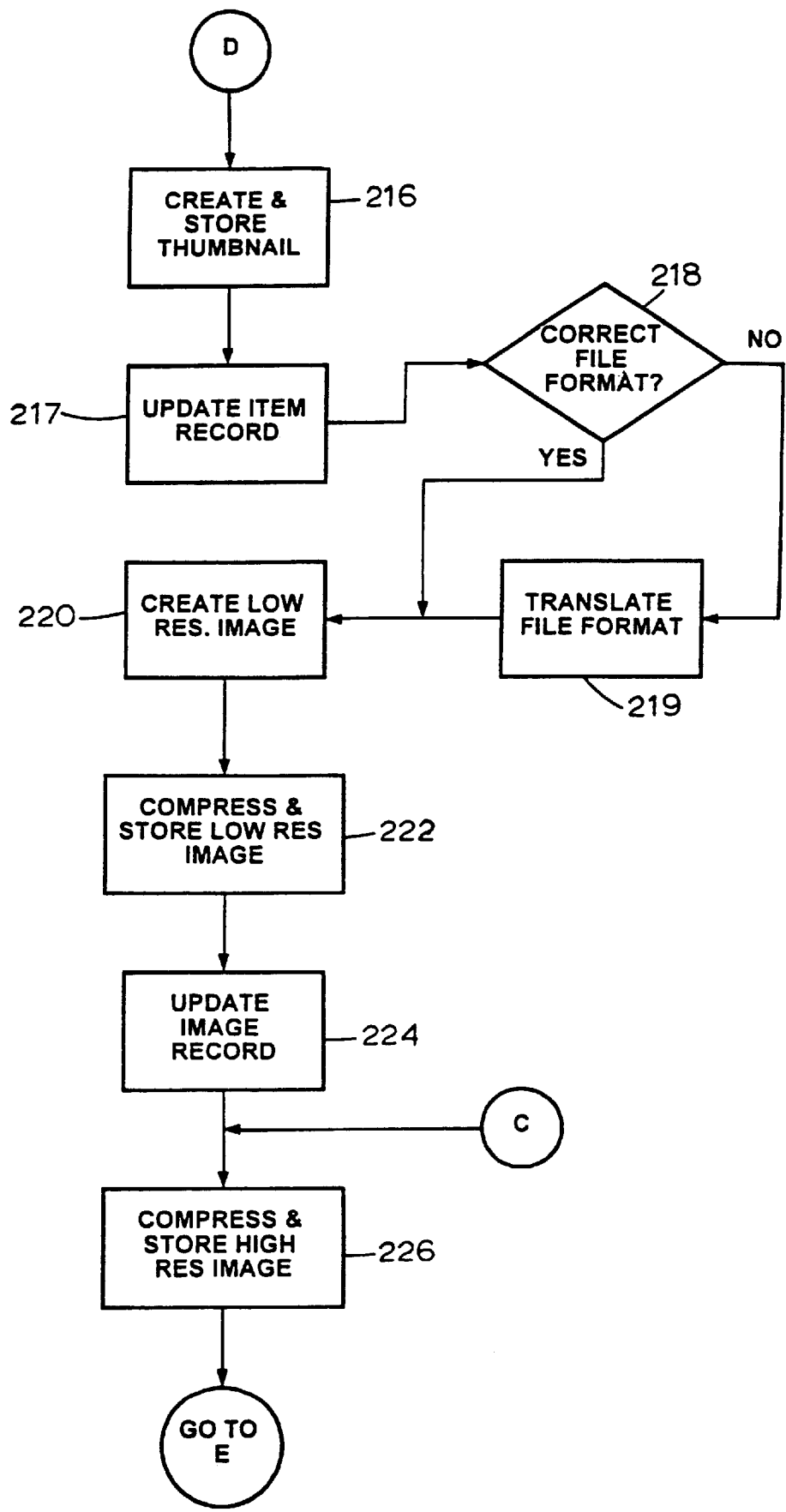
Figure 4C:
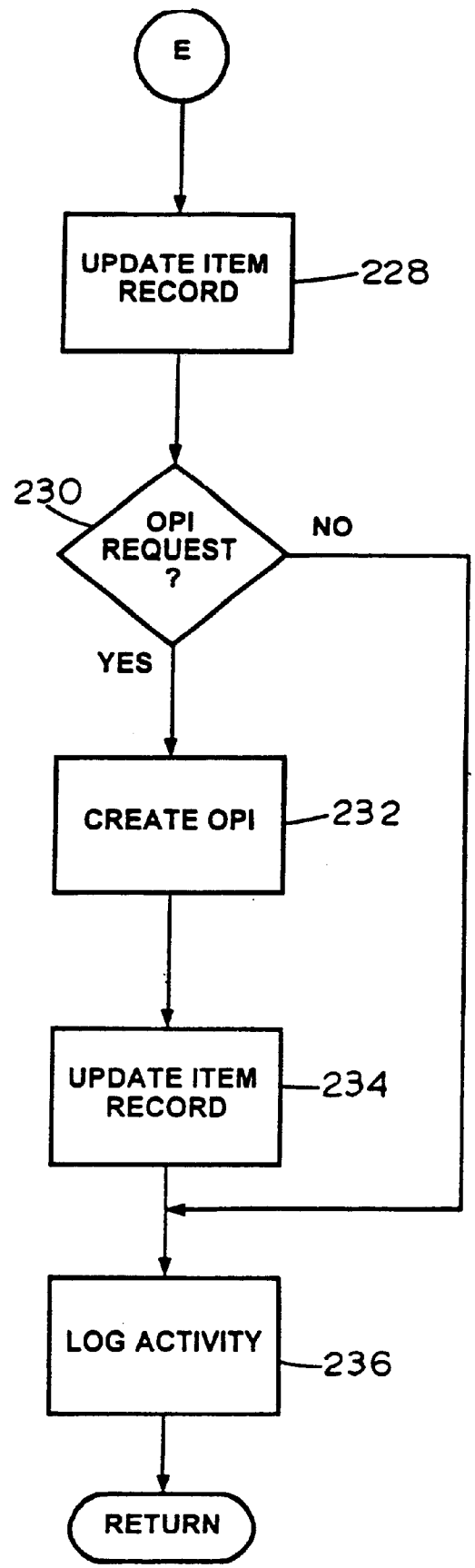

FIGS. 4A–4C together comprise flow charts illustrating one possible embodiment of the autolog routine of the system of FIG. 1.

Figure 5:
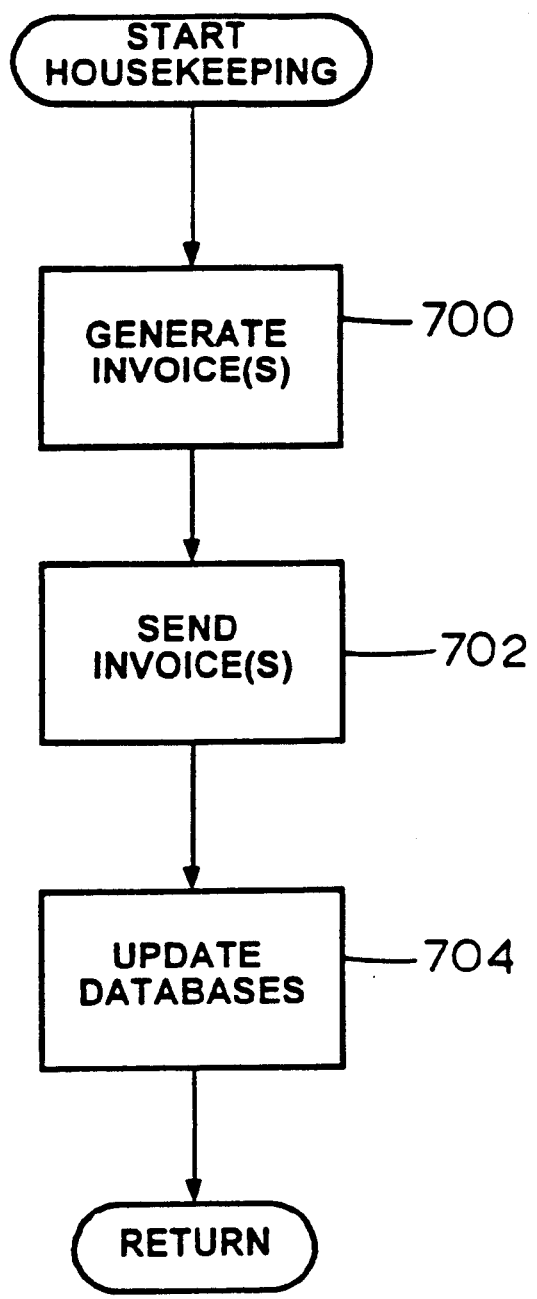

FIG. 5 is a flow chart illustrating one possible embodiment of the housekeeping routine of the system of FIG. 1.

Figure 6:
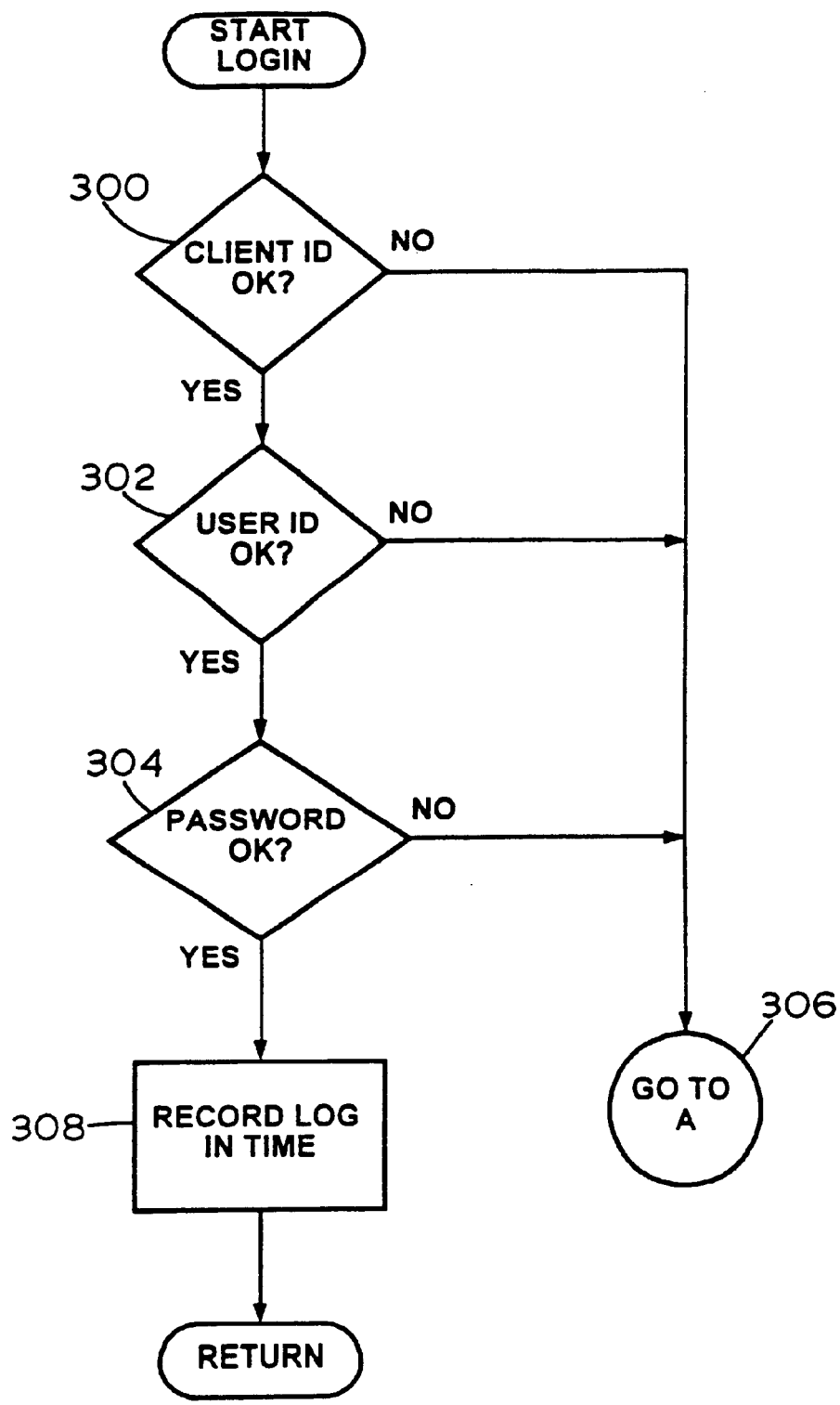

FIG. 6 is a flow chart illustrating one possible embodiment of the login routine of the system of FIG. 1.

Figure 7A:
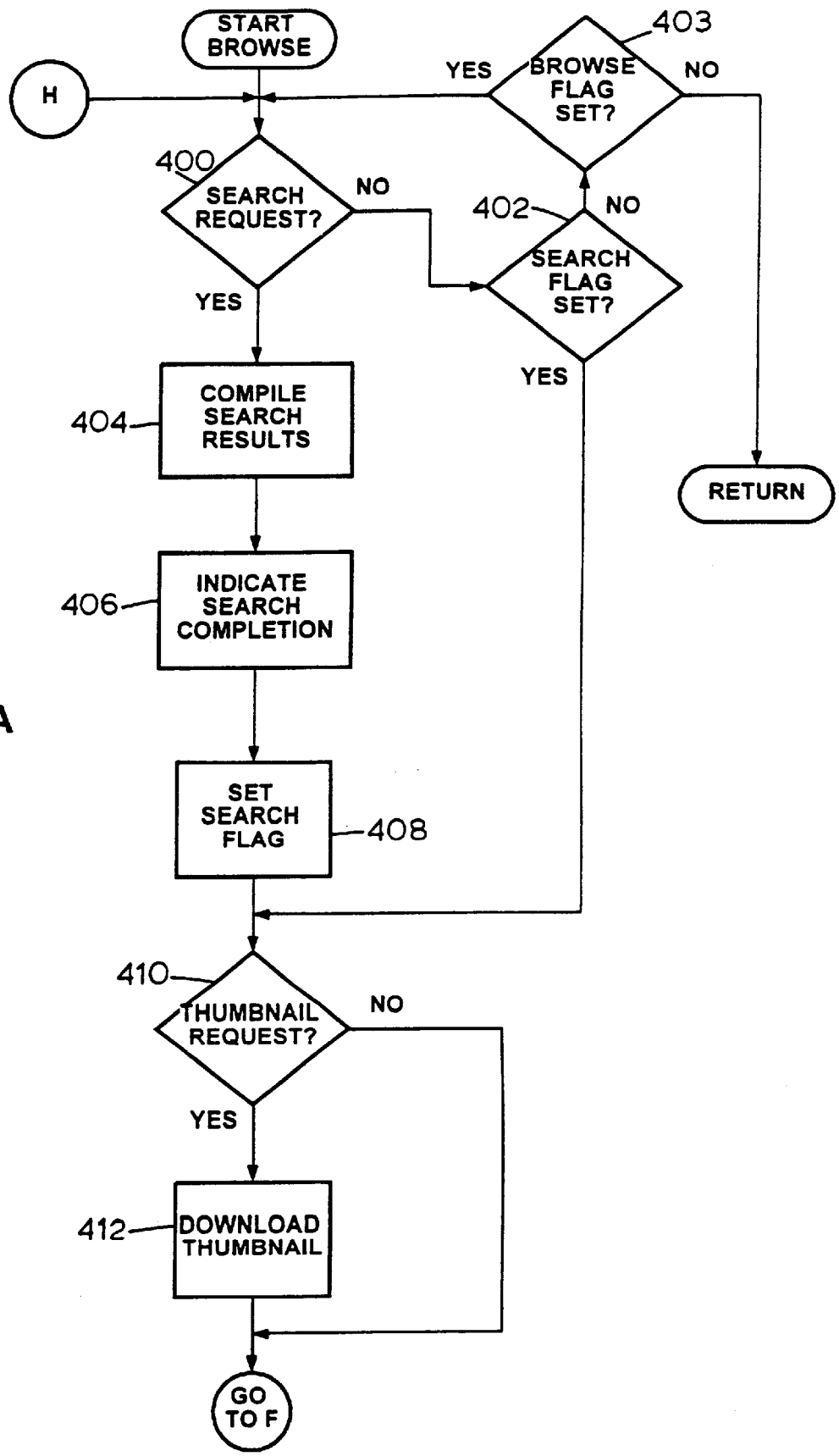
Figure 7B:
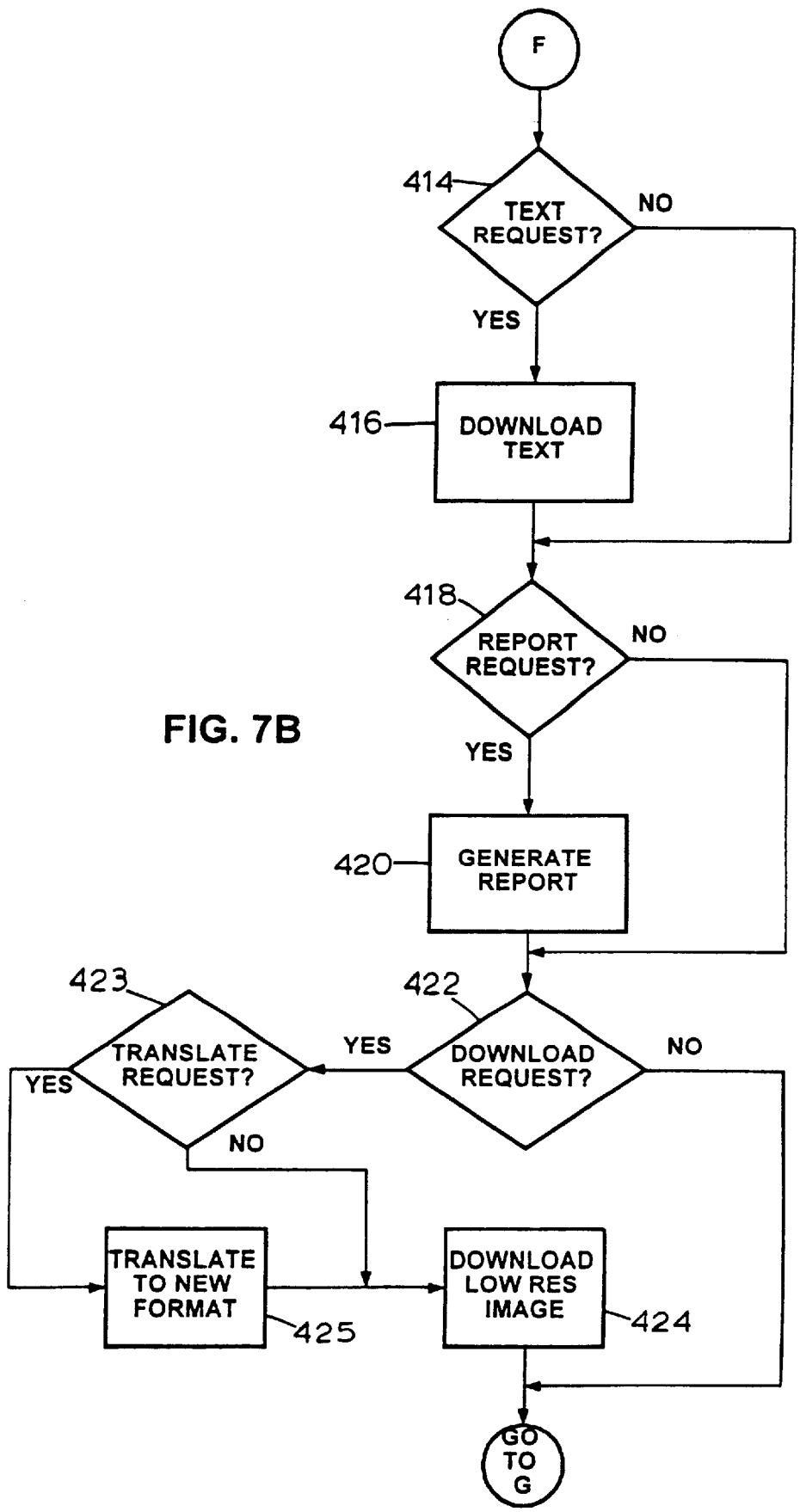
Figure 7C:
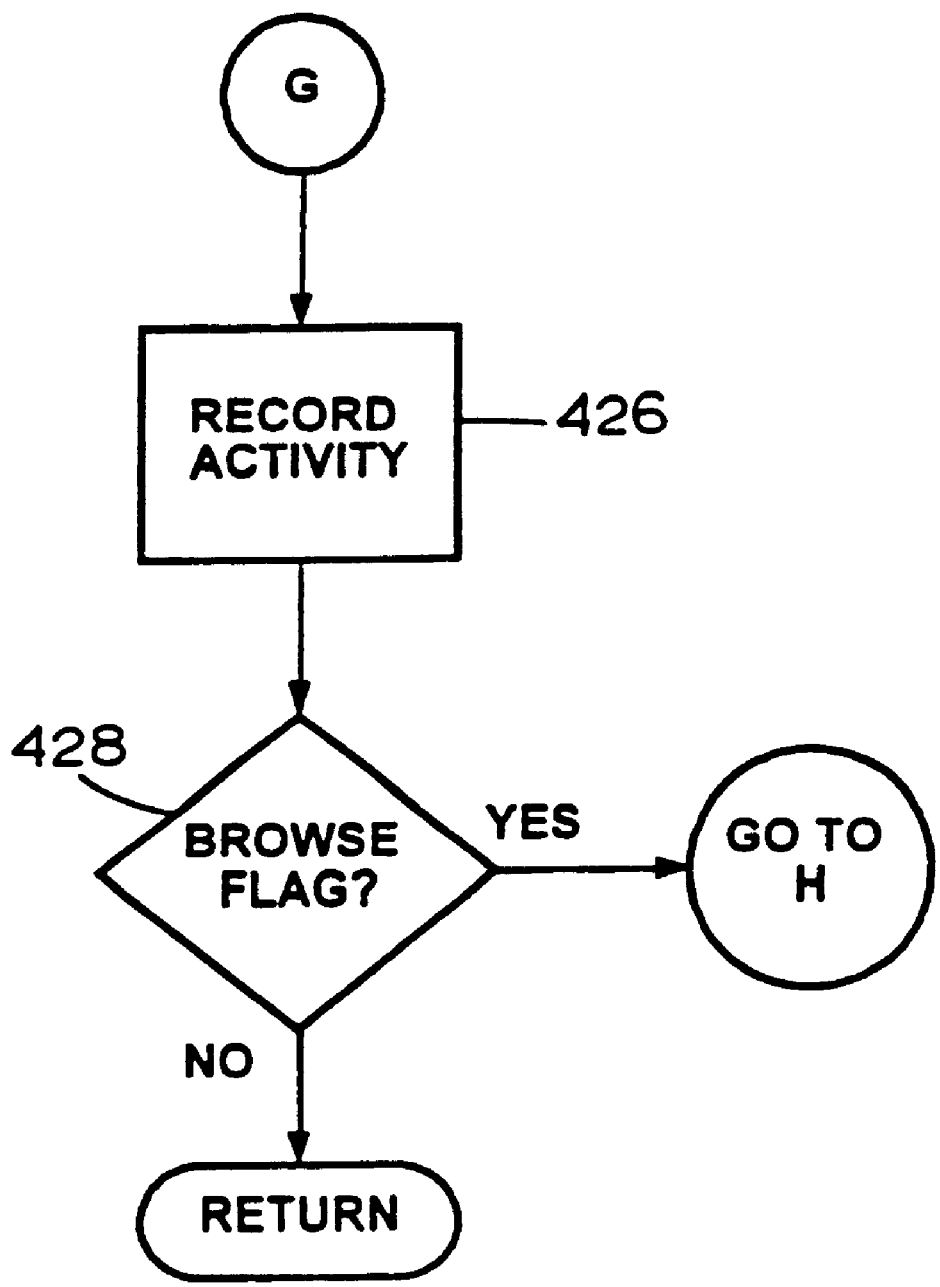

FIGS. 7A–7C together comprise flow charts illustrating one possible embodiment of the browse routine performed by the system of FIG. 1.

Figure 8A:
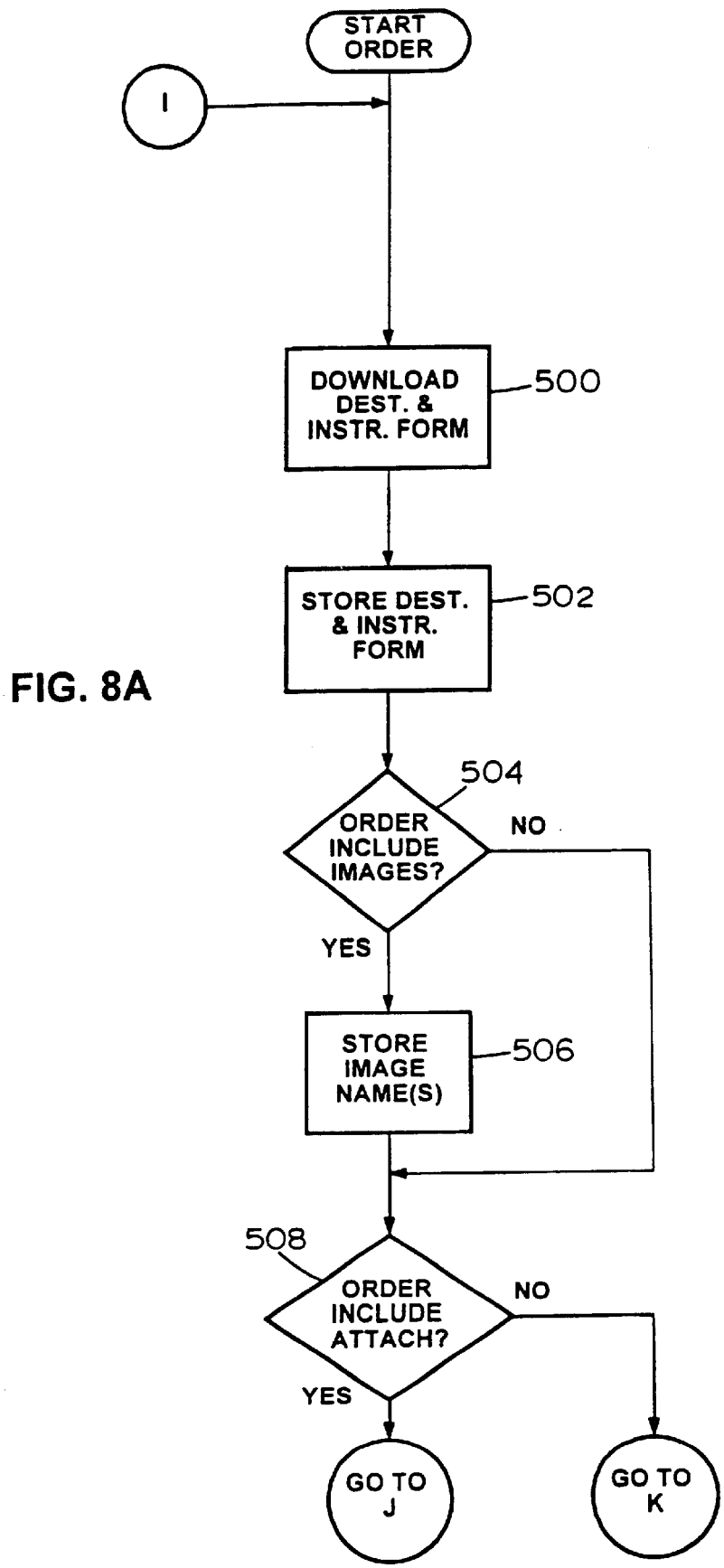
Figure 8B:
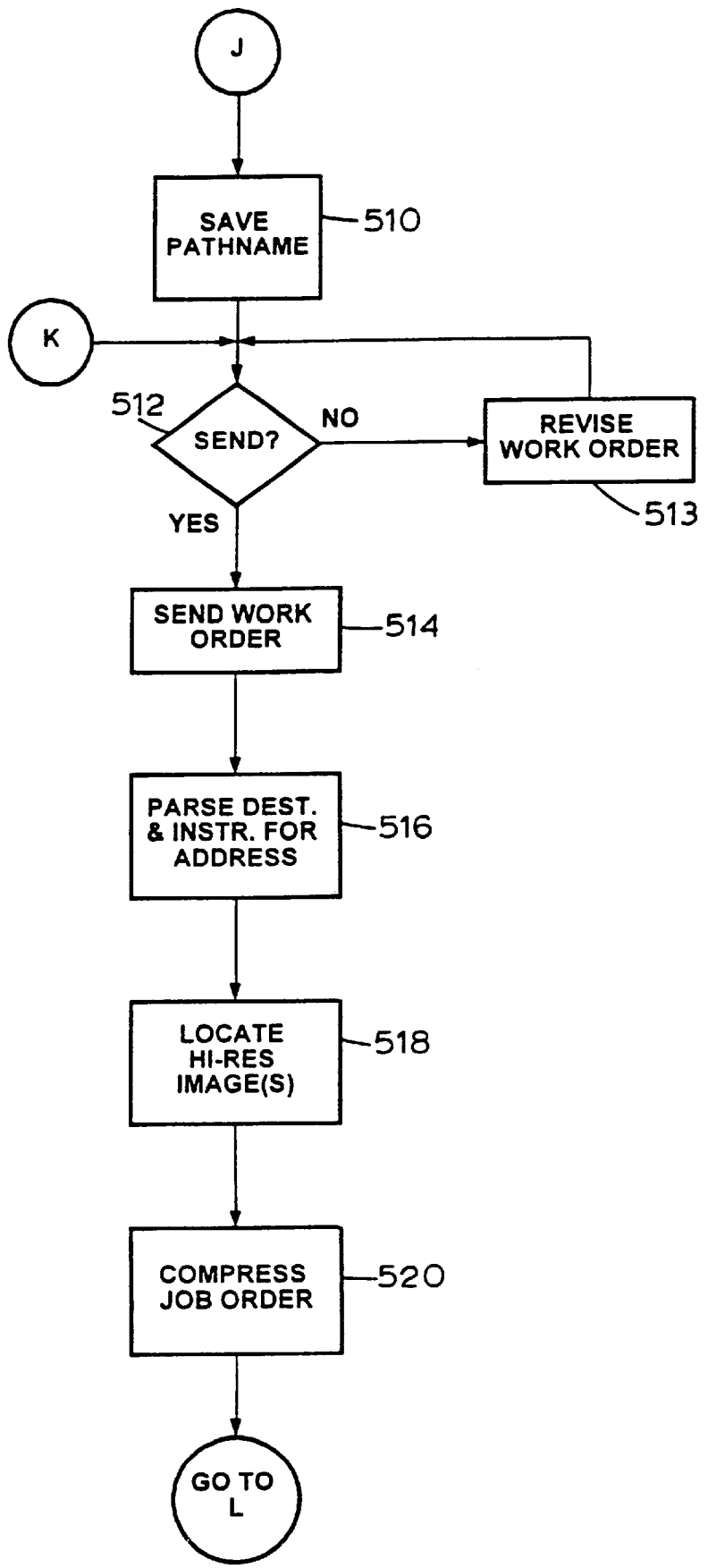
Figure 8C:
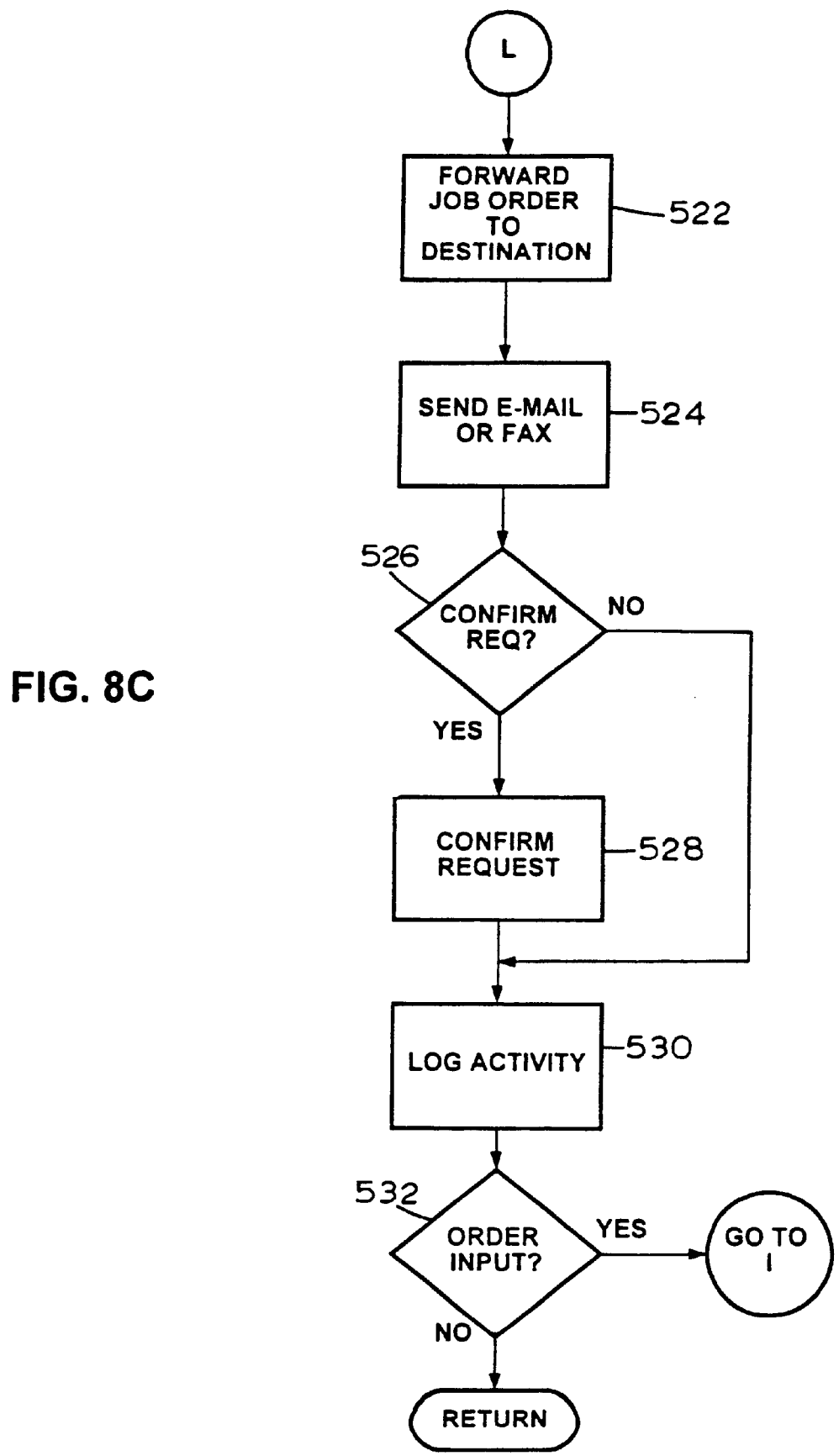

FIGS. 8A–8C together comprise flowcharts illustrating one possible embodiment of the order routine of the system of FIG. 1.

Figure 9A:
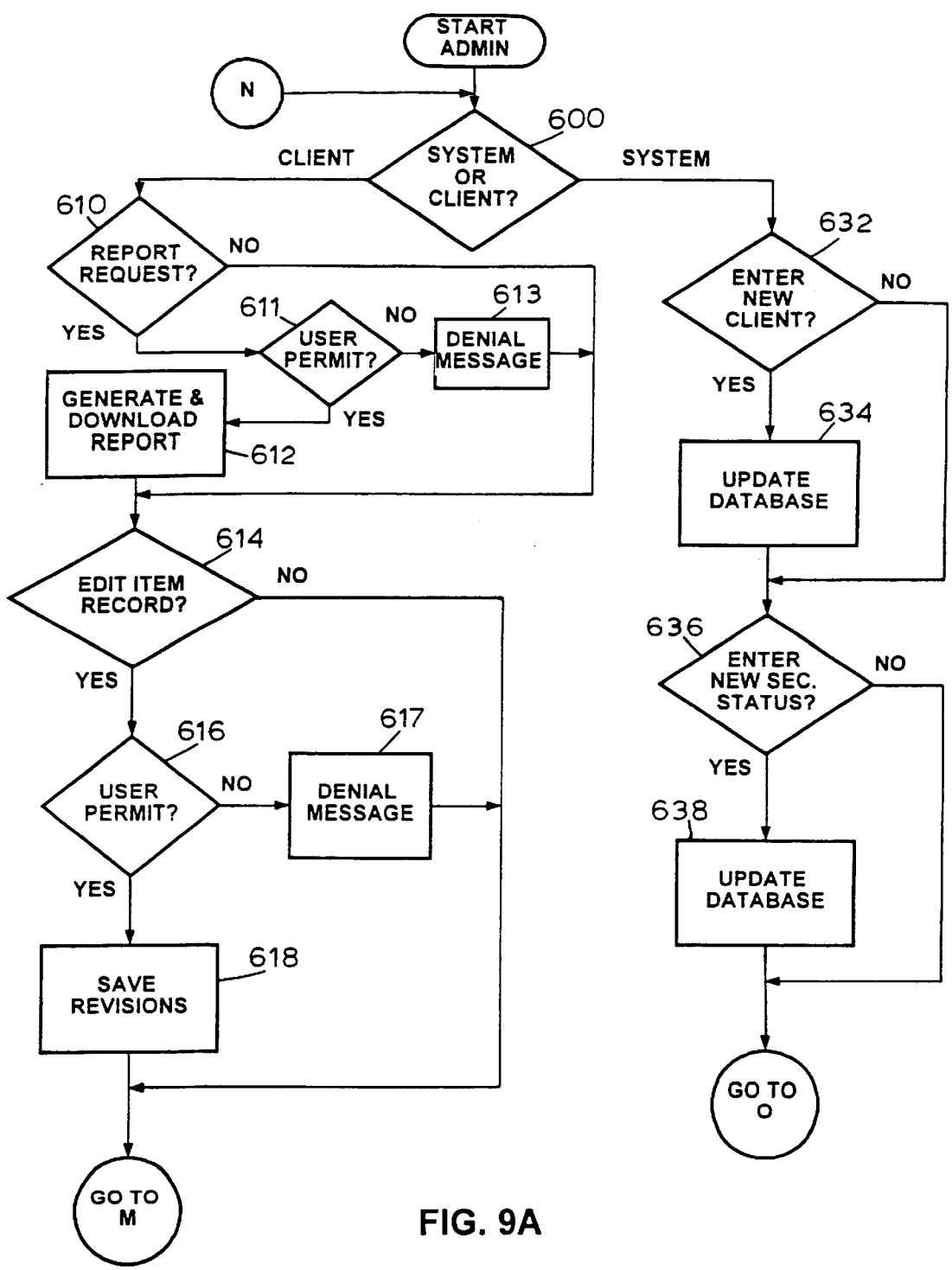
Figure 9B:
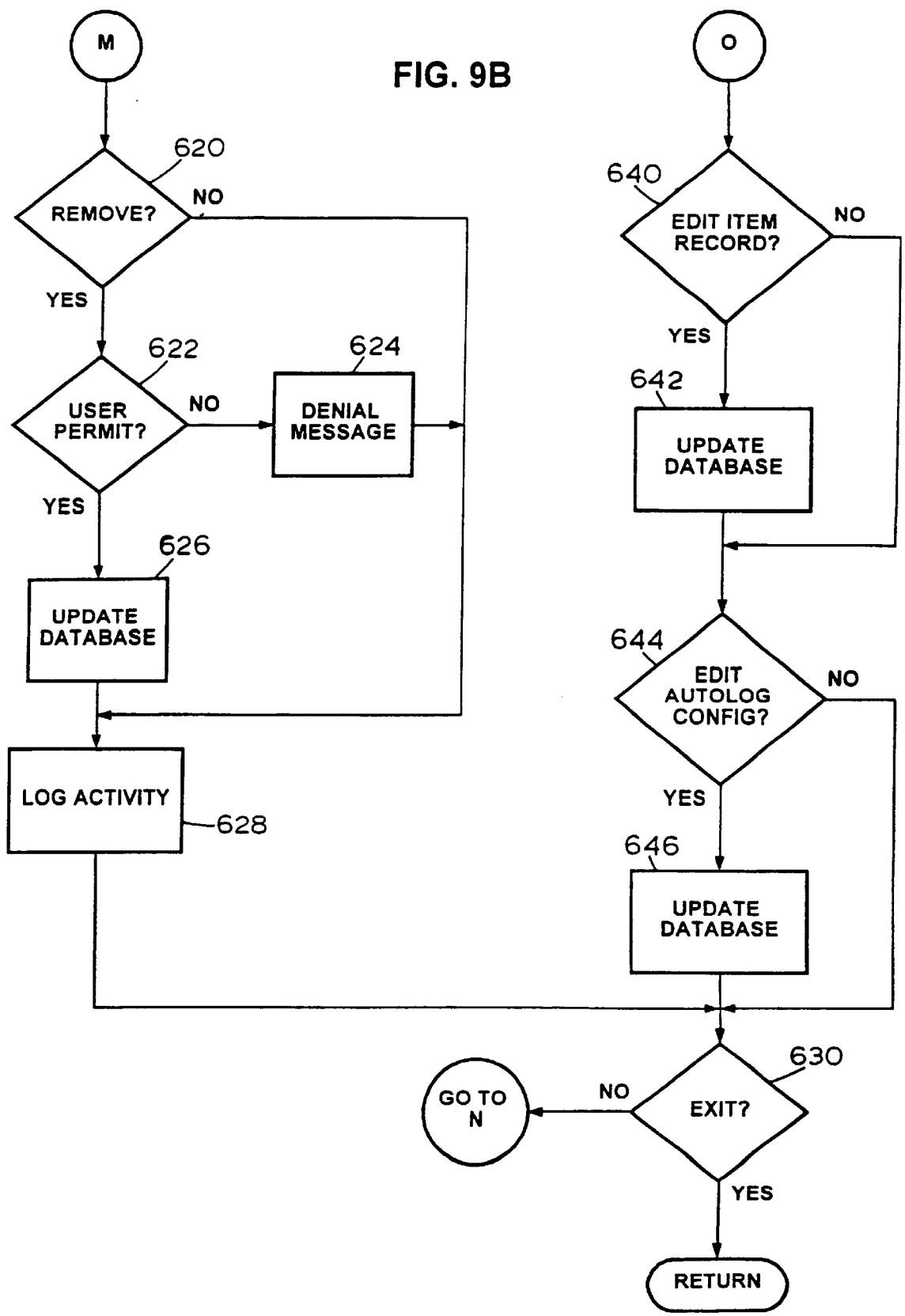

FIGS. 9A–9B together comprise flowcharts illustrating one possible embodiment of the administration routine of the system of FIG. 1.

Figure 2:
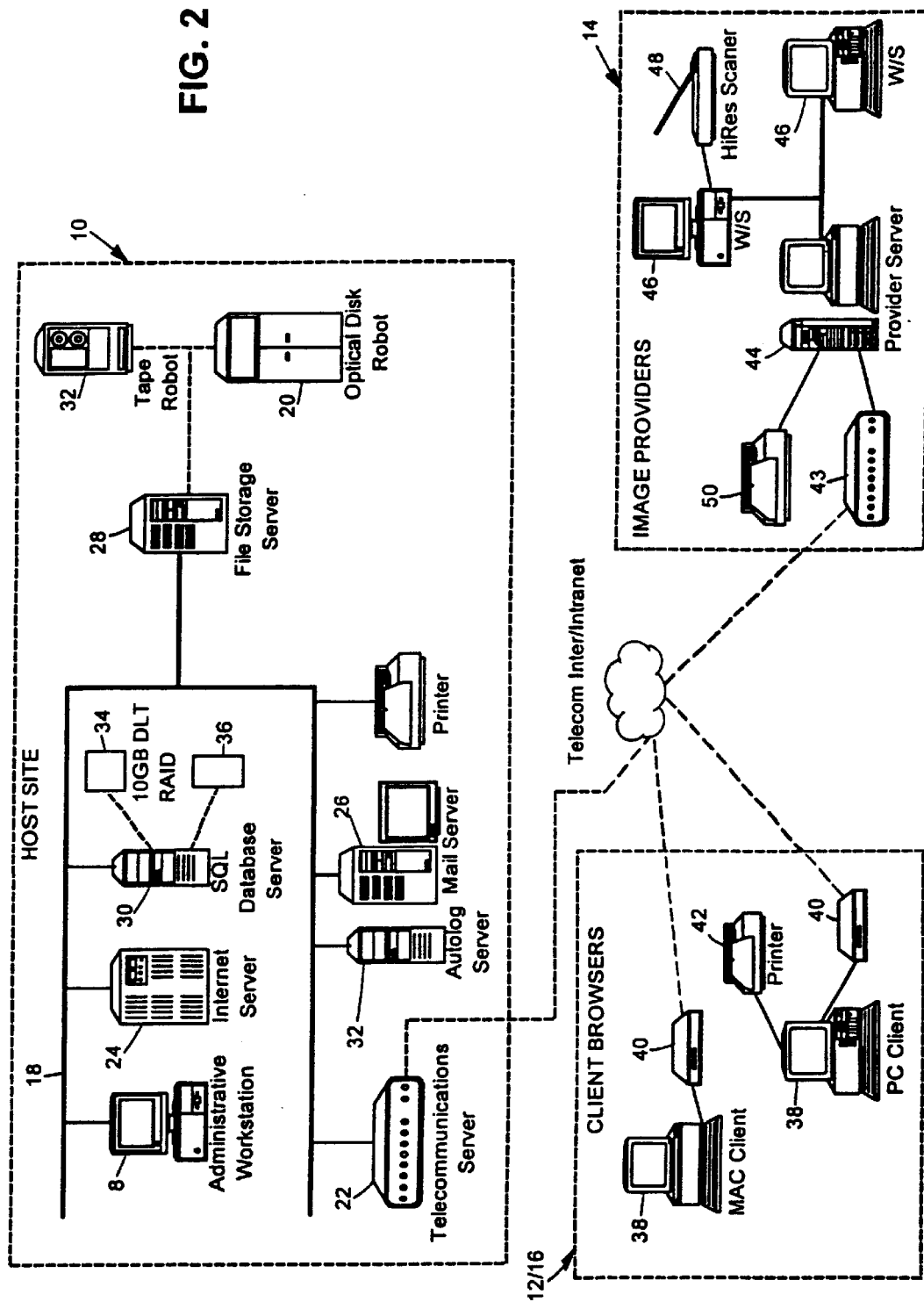
FIG. 2 is a schematic illustration of a preferred embodiment of the inventive system shown in an environment of use.

FIGS. 10A–10J are system diagrams illustrating the preferred operation of the system of FIG. 2.

DESCRIPTION OF THE PREFERRED EMBODIMENTS

A data management and work order delivery system constructed in accordance with the teachings of the invention is illustrated generally in FIG. 1. As detailed below, the system is implemented to provide a centralized database that can be accessed, searched and modified by authorized users. Although the system can be used to store any type of digital data, in the most preferred embodiments it is primarily utilized to store digital images. As explained below, the system is also adapted to serve as a job order developer and conduit for routing files from a browser or client such as an advertizing agency to a jobber or supplier such as a printer. Thus, the system is preferably adapted both to store digital assets and to facilitate use of those assets by providing a ready means for distributing assets to authorized users.

This combination of capabilities renders the system ideally suited for facilitating publication and the like. For example, a first user such as a corporation, may have a number of digitized images of its products. In order to provide easy access to those images and to efficiently utilize its in-house computer storage facilities, that corporation can save these digital assets on the data management system. If, on occasion, the corporation wishes an advertizing agency to create a publication, such as a brochure or web page, incorporating one or more of those digital images, the corporation need only provide the agency with access to the system.

Once given permission and provided with suitable password information, the advertizing agency could then access the system; search the database of the corporation's digital images; and download low resolution copies of images to be used in the publication. The agency would then disconnect or logoff from the system and begin its efforts to create a document incorporating the downloaded images. Upon completion of that process, the agency would re-connect to the system to request that the system electronically route the created document with high resolution copies of the selected digital images to a publishing entity such as a printer, where the finalized brochure would be published.

Advantageously, the low-resolution images downloaded to the agency preferably have a relatively low bandwidth communication requirement and can be transmitted in a relatively short amount of time. Such images are also far less taxing on the computer resources of the agency during the creation of the brochure than high resolution copies of those same images. After the images are stored on the system, high resolution versions of the images, with their relatively high bandwidth communication requirements and relatively long transmission times, are preferably only downloaded when required; such as when printing or otherwise publishing a finalized product incorporating such images.

Although in the presently preferred embodiment, low resolution and high resolution images are selectively employed to achieve the advantages discussed above, those skilled in the art will readily appreciate that improvements in areas such as compression technology could ultimately limit or eliminate those advantages. Accordingly, those skilled in the art will appreciate that the system could also be implemented to download and route digital images having the same or substantially the same resolution without departing from the scope or spirit of the invention.

As used herein, "high resolution" refers to digital data as originally stored on the system. As used herein, "low resolution" is any abbreviated version of the originally stored data. "Low resolution" can mean that the subject copy of the data has a different size than the original data (e.g., 3 inches by 2 inches instead of 6 inches by 4 inches), or that the subject copy of the data has a lesser amount of information than the original data (e.g., 100 pixels instead of 800 pixels).

Also, as used herein, "publication" refers to any conveyance of information via any medium. Examples of publication include, without limitation, storing, displaying, distributing, or otherwise conveying data on a printed page, on a display screen such as a CRT, on a web page, on a video tape, on an audiotape, on a compact disc, on a digital video disc, on a floppy disc, and/or in a broadcast communication.

In order to provide the centralized storage noted above, the system is preferably provided with a host system 10. As illustrated in FIG. 2, although the host system 10 can be implemented in a wide variety of ways, in the preferred embodiment it is implemented by a number of programmed processing devices in the form of task specific servers connected via a local area network (LAN) 18. As shown in FIG. 2, these servers preferably are: a telecommunication server 22 for effecting communication with users and the like; an internet server 24 for supporting internet applications such as a web page as well as supporting communication via the internet; a mail server 26 for performing e-mail and fax messaging; a file storage server 28 for controlling access to the digital data; an SQL database server 30 for performing text-based searching and controlling storage of operating and other data; and an autolog server 32 for processing digital data to be stored on the system 10. Any server system can be implemented to undertake at least some of these functions without departing from the scope of the invention including, without limitation, IBM®, IBM® compatible, Intel® based compatible, and Digital Equipment® Alpha® based or Alpha® based compatible systems. Preferably, the system runs on the Windows NT® server operating system, but other operating systems would also be appropriate.

For the purpose of effecting the database functions described above, the host system 10 includes storage means for storing high and low resolution image data having high and low bandwidth communication requirements, respectively. In the preferred embodiment, the storage means is implemented by an optical data reader serviced by an optical disk robot 20, although other storage devices such as the tape robot 32 shown in FIG. 2 are likewise appropriate. The host system 10 is preferably also provided with other storage devices including a tape or optical robot driven storage device 34 to perform backup of operating system and transactional software, and an external RAID sub-system 36 for buffering client data. Of course, some or all of the servers mentioned above would also have internal hard drives for additional storage. Exemplary devices for implementing these devices include, without limitation, a Quantum DLT 2000 digital linear tape drive (34), a Document Imaging Systems Corp. (DISC) D-255U Optical tape robot subsystem (32), and an nSTOR model CR8e-390T 27 gigabyte tower RAID subsystem (36).

To permit data files to be input and moved to the various storage devices 20, 32, 34, 36 of the host system 10, as well as to permit co-operative operation of the various servers 22, 24, 26, 28, 30, 32, the servers are preferably networked together using an industry standard local area network (LAN) 18. One possible example of such a LAN implementation includes, without limitation, connecting the servers with a 10Base-T twisted category 5 twisted pair cable (10 megabit/sec—Ethernet 802.3 protocol). By way of example, not limitation, higher bandwidth requirement systems may substitute 100 Base-T (100 megabit/sec) connections or ATM (asynchronous transfer mode) at 155 megabits/sec connected with category 5 twisted pair or fiber optic connections.

As shown in FIG. 1, the host system 10 is adapted for communication with a plurality of users including, without limitation, browsers and client orderers 12, image providers 14, and jobbers 16. Image providers 14 are, generally speaking, the owners or developers of digital data to be stored on the system. They are the users that wish to take advantage of the efficiencies associated with the centralized storage and electronic routing capabilities offered by the system. Jobbers or suppliers 16 are, generally speaking, agencies such as printers, broadcasters, and the like. Browsers and orderers 12 are users given permission by the image providers 14 to access the database. Examples of browsers and orderers include advertising agencies, consultants, and the like.

As generally illustrated in FIG. 1, communication between the host system 10 and the various users 12, 14, 16 can be effected by any known means of connectivity. For example, the users 12, 14, 16 can access the host system 10 or communicate with one another through local area networks or wide area networks. Wide area networks can be implemented through dial-up or dedicated communication servers. Examples of dedicated connections which could be used in this role include, without limitation, a phone line with an asynchronous modem rated at 28.8 Kbps or higher; ISDN dial-up BRI (basis rate interface) rated at 112 Kbps or 128 Kbps; and ISDN dialup PRI (primary rate interface) rated at 64 Kbps up to 1.536 Mbps (or 1.920 Mbps in Europe). Examples of dedicated connections suitable for this role include, without limitation, a T1 link between two locations (1.5 Mbps) or fractionalized T1; frame relay (56 Kbps to 1.5 Mbps); switched multi-megabit data service (SMDS); cable broadband connections; synchronous optical network (SONET); point to point directional microwave; or very small aperature satellite (VSAT) linkages. As shown in FIG. 1, dial-up telephone communication can be direct or via the internet. If desired, the host system 10 and users 12, 14, 16 can be hardwired to one another as an intranet.

Preferably the host site 10 is adapted for communication with users having a wide variety of computer systems. For example, the suppliers and browsers 12, 16 can be provided with a workstation or personal computer (PC) 38 and a modem 40. Optionally, these users can be provided with a hard-copy output device such as a printer 42 as shown in FIG. 2. By way of example, not limitation, the workstation or PC's 38 may be implemented as an IBM®, IBM® compatible, any Intel® based compatible, Digital Equipment® Alpha® based, Alpha® based compatible, Apple® Macintosh®, Sun SPARC®, Sun compatible, or Internet appliance computer system. Although other operating systems may likewise be appropriate, these workstations or PC's preferably run Microsoft® Windows 95®, Windows NT®, Windows NT® Workstation, MAC OS 7.X, Sun Solaris®, MAC Next, OS/2 or any other operating system capable of running Microsoft Internet Explorer®, Netscape Navigator® or any other suitable browser.

Although other configurations and systems are appropriate, the computer system(s) of the image provider users 14 are preferably implemented by a telecommunication server 43, a provider server 44, and one or more workstations 46. As with users 12, 16, the computer system (s) of the image provider user 14 can also optionally include a high resolution scanner 48, and/or a hard-copy output device such as a printer 50 for printing out local reports, work orders, and administrative reports. By way of example, not limitation, the computer system(s) at the image provider user 14 can be implemented by an IBM®, IBM® compatible, any Intel based compatible, Apple® Macintosh®, Digital Equipment® Alpha® based, or Alpha® based compatible computer. The computer systems at the image provider 14 preferably operate the Microsoft Windows NTe server operating system, but other operating systems such as the UNIX operating system are also appropriate.

The operation and structure of the data management system will now be described in connection with the flowcharts appearing as FIGS. 3–9. As those skilled in the art will appreciate, the majority of the software utilized to implement the data management system is run on servers located at the host site 10. However, parts of the software can also be run locally on the client machine. As the precise location where the steps are executed can be varied without departing from the scope of the invention, FIGS. 3–9 do not address which machine is performing which functions. That subject is fully addressed in connection with FIG. 10 below, after the overall system operation is described.

As mentioned above, in the preferred embodiment the software running the data management system is executed on the computers located at the host site 10 and user locations 12, 14, 16. Preferably, the software generates a graphical user interface at each of these locations. The graphical user interface provides a user-friendly means for interaction between the system and users. The host software includes four main databases, namely, an image database, an activity database, a configuration database and a mail database. The image database is adapted for archiving low and high resolution copies of digital image files. The image files are linked to an item record which includes information about the stored image files including, without limitation, pathnames to the low resolution and high resolution image files, a client identification notation, and a number of user-specified fields of information used for searching. The activity database is used to record events occurring at the system such as: storing new data on the system; deleting data from the system; logging on and off the system; performing a search on the system; downloading data from the system; and routing a job order to a user. The mail database is used to store e-mail, fax numbers, and conventional addresses for users. Finally, the configuration database is preferably used to save certain parameters for establishing communications with and between users. These above-noted databases are managed by a database manager program running on the SQL database server 30 such as Microsoft SQL. In the preferred embodiment, the image database is implemented by the SQL database server 30 and the file storage server 28; the activity database is implemented by the SQL database server 30; the configuration database is implemented by the SQL database server 30; and the mail database is implemented by the SQL database server 30 and the mailserver 26.

As those skilled in the art will appreciate, the host site 10 is programmed to communicate with a plurality of users at the same time. Thus, although in the following for ease of explanation the operating steps are described as occurring in a particular time sequence and addressed as if a single user is interacting with the system, in reality the system will preferably be adapted to perform any number of the operating steps and routines at a given time. For example, the host system 10 may be running the autolog routine (FIGS. 4A–4C) in response to a communication from User A while also running the order routine (FIGS. 8A–8C) in its interaction with User B. Preferably, User A and User B are completely unaware of the other's interaction with the system and the system responds to the inputs of any given user as if that user were the only party interacting with the system.

Turning to the general operating software of the system depicted in FIGS. 3A–3B, when the system is first brought on-line at the host site 10, a number of initialization processes are performed by a block 100. These initialization steps include such conventional housekeeping tasks as testing and configuring memory at the individual servers 22, 24, 26, 28, 30, 32; establishing protocols for communication on the LAN 18; loading memory resident software into memory; and other administrative functions such as client user account setup, and client database structure setup. Some or all of these housekeeping functions are performed by each of the servers 22, 24, 26, 28, 30, 32. The noted administrative functions are performed by the administrative workstation 8. After the system 10 has been properly initialized, a flag or counter is checked to determine whether it is time to call a housekeeping routine depicted in FIG. 5 and discussed below (block 102).

Assuming the housekeeping routine is not called, the database management system enters into a holding state where it continually checks for an input from a user (blocks 104 and 106). Such an input can take the form of an attempt to log in to the system or the delivery of a data file for storage on the system. Assuming for purposes of explanation that the database management system determines that a data file has been received for storage in the storage device at the host site 10 (block 106), the system will identify the client who sent the file and call the autolog routine (block 108).

Upon initialization of the autolog routine (FIG. 4A), the autolog server 32 first determines whether the received file is compressed (block 200). If it is not compressed, the server stores the received file in a temporary file (block 204). If the received file is compressed, the server 32 decompresses the file in accordance with conventional decompression algorithms (block 202) before storing the received data file to the temporary file (block 204).

The autolog server 32 then polls the file storage server 28 to determine whether the received file has the same filename as any existing file (block 206). If so, the autolog server 32 appends a suffix to the filename of the newly received file (block 208). This approach is implemented to ensure digital data archived on the database management system is not lost or otherwise deleted unless an affirmative request to delete is received from an authorized user.

After an appropriate filename is chosen, the autolog server 34 creates an item record and stores it in the image database (block 210). As mentioned above, item records are akin to summary sheets for the stored digital data. They contain information identifying the pathnames of their associated image files (preferably low and high resolution copies) and include several user defined fields to enable searching. In the preferred embodiment, the creation of the item record by block 210 does not render the digital data part of the searchable database. Instead, the image provider user must login to the system; review the item record; optionally fill in the data fields to permit subsequent searching; and approve the item record and its associated image for searching. Only after the image provider user 14 approves the item record is the status of the new data file changed to enable searching. This status change can be noted by a flag or field associated with the item record.

After the item record is created and stored, the autolog server 32 examines the newly received data file to determine whether it is an image file (block 212). If the data to be stored in the data management system is not an image file, the system 10 skips ahead (block 214) to block 226 in FIG. 4B. Assuming for the moment that an image file has been received, the host site 10 generates a thumbnail representation of the image (block 216). This thumbnail representation is preferably a JPEG file that is developed by making a copy of the original file, discarding some of the pixel information, and shrinking the image to about one square inch in size. The thumbnail representation is stored in the image database. The newly created item record is then updated to include the pathname of the thumbnail file (block 217).

In accordance with an aspect of the invention, the autolog software and server 34 can optionally be adapted to translate new image files received from a user 14 into a predetermined file format. For example, a user 14 can instruct the system 10 to save its image files as tagged image file format files.

Upon receiving a new image file, the autolog server 34 determines whether the new file is in the predetermined format (in this instance, the TIFF format) (block 218). If not, the autolog server 34 translates the new image file into the predetermined file format (block 219). If the new file received from the user 14 is already in the predetermined file format (block 218), the autolog server 34 proceeds to block 220 without performing a translation. In order to enable the autolog server 34 to translate received files pursuant to the user's instructions, the autolog software preferably includes a translation matrix providing instructions on how to translate files between commonly used file formats.

Regardless of whether a file format translation is performed, a full scale, low resolution copy (hereinafter the "low res image" or "low res copy") of the image is then generated (block 220). As discussed above, this low resolution image will have a lower bandwidth communication requirement than the original, higher resolution image received from the image provider user.

In accordance with an aspect of the invention, the autolog software and server 34 are adapted to perform a user-defined type of compression on the image data to be stored pursuant to a preset, user defined, compression value. For example, if TIFF (tagged image file format) or CT (Scitex continuous tone) files are passed to the autolog server 34, and the image provider user 14 has previously indicated that its files are to be compressed in accordance with a medium value Adobe® JPEG compatible compression technique, the autolog server 34 invokes the appropriate compression algorithm, applies the compression routine, and stores the image file in the image database in the manner specified by the user 14 (block 222). To this end, the autolog server 34 is preferably provided with a library of industry standard algorithms which can be invoked as required to perform the compression type and level requested by the user. Preferably, the image provider user will specify its desired compression algorithm and compression value when its account is opened, and this information will be saved in the host system 10 for use when new files arrive.

Following the block 222, the autolog server 34 then updates the corresponding image record to include the pathname of the low resolution image file (block 224). Subsequently, the autolog server 34 utilizes the user compression algorithm specified by the user to compress and store the original image file, which is preferably a high resolution digital image, in the appropriate database (block 226). As with the processing of the lowres image file, the server 34 preferably updates the associated item record to include the pathname of the original image file (block 228). Preferably, both the low resolution and the original image file are stored in the file format selected by the user if the option discussed in connection with blocks 218 and 219 is implemented.

As shown in FIG. 4C, the autolog server 34 next determines whether a special low resolution format file such as an OPI (Open Pre-press Interface) file should be created from the original image file (block 230). Depending upon the implementation selected, this step can be performed in a number of ways. For example, the image provider user 14 can specify that all of its files are to include OPI versions. This information can be saved on the system 10 and, whenever a new file is received from that particular user, the prior instruction is checked and the OPI file is created by the autolog server 34 (block 232). Alternatively, the autolog software could recognize a request for an OPI version forwarded with the original file and execute the blocks 232, 234. Under either approach, the server 34 skips blocks 232 and 234 when an OPI file is not desired. When an OPI file is indicated, the server 34 creates and stores the file (block 232), and updates the item record with the OPI pathname (block 234).

As shown in FIG. 4C, the autolog routine is completed by logging the activity in the activity database (block 236). By way of example, not limitation, the system 10 could log such things as the date on which the file was stored; the amount of memory used by the stored files; and/or the presence of an OPI file. These recorded events can be used later to generate invoices to the appropriate image provider users 14 as explained below. Preferably, the autolog server 34 interacts with the database server 30 via the LAN 18 to log the noted activity.

Returning to FIG. 3A, after the autolog routine is completed, the system 10 again checks to see if the time for performing the housekeeping routine has arrived (block 102). If it has not (as will be assumed for the present), the system 10 continues to cycle among blocks 102, 104 and 106 until a user transmits another file, a user attempts to log in; or the time for performing the housekeeping routine arrives.

When the system 10 determines that a user 12, 14, 16 is attempting to log in, the login routine is called. Each image provider user 14 is isolated from all other image provider users 14 by a unique client identification number. In the preferred embodiment, this number comprises five digits. Each user of this system is assigned a unique prefix code, (in the presently preferred embodiment 3 digits). This prefix code is used to secure the file stored in the database management system from unauthorized access. Each image provider user 14 can specify users (such as browsers and client orderers 12 and jobbers 16) who are to be granted access to the files of that particular image provider user 14. Each such specified user is assigned a user name and password. As will become apparent from the following, this authorization scheme is used by the host system 10 in conjunction with the login routine to provide a user discriminator for discriminating between users communicating with the system to control user access to the digital data stored on the database management system.

Significantly, the digital data of every image provider user 14 is transparent to all users except those users authorized to view the data. In other words, if Image Provider A and Image Provider B have both stored data on the data management system, and Image Provider A has authorized User C to search and access its data, User C will not only be prevented from accessing the data of Image Provider B, but User C will not even be able to tell that Image Provider B has stored data on the system. Indeed, if desired, the system can be configured to display a welcome screen or the like to authorized users logging in under a given Image Provider User's authority that indicates that the database of that particular Image Provider User is being addressed. In such an approach, a user might not even realize they are addressing a centralized, third-party data storage facility available to many different entities.

In any event, when the login routine is called, the internet server 24 of the host system 10 interacts with the user logging in via the communication servers 22, 24 to receive various inputs. Specifically, as shown in FIG. 6, the internet server 24 determines whether the subject user has entered a valid client identification number (block 300), a valid user identification name authorized by the client identified in block 300 (block 302), and the appropriate password (block 304). If at any of these blocks (300-304) the system 10 determines that an incorrect response has been entered, the login routine is terminated (block 306) and the system 10 returns to Step 102 in FIG. 3A. On the other hand, if appropriate inputs are entered at each of blocks 300, 302 and 304, the internet server records the log in of the identified user in the activity database (block 308). In the preferred embodiment, the length of time a user remains logged into the system is recorded. Thus, in addition to the user's identity, the internet server preferably records the time at which the identified user gained access to the system at block 308.

After logging this activity, the internet server 24 enters a loop illustrated by blocks 112, 116, 120, 126 and 130, in FIGS. 3A and 3B. In this loop, the system waits for the user to enter an input indicating that certain browsing activities are to be performed (block 112); a job order is to be developed (block 116); administrative activities are to be performed (block 120); or that the user wishes to log out (block 126). Preferably, this arrangement is affected by means of the graphical user interface discussed above. Particularly, the "browse", "order", "administrative", and "logout" inputs are preferably displayed as choices on the user's screen. By selecting one of these inputs, the user will preferably be given access to pull-down menus which provide further options and facilitate easy communication with the system 10.

Assuming for purposes of explanation that the user selects the browse category displayed on the graphical user interface (through a mouse or other conventional input device) (block 112), the internet server 24 of the database management system will enter the browse routine (block 114). Upon entering the browse routine, the system 10 preferably displays a pull-down menu to the user listing possible actions to be performed. One of the actions listed on the menu is preferably a search request. If the user selects the search request from the menu (block 400, FIG. 7A), the system 10 will request the user to enter search parameters. Upon receipt of the search criteria, the internet server 24 will then search the user-specified fields in the item records belonging to the authorizing image provided user 14 and compile a set of digital data that meets the search criteria (block 404). As shown in FIG. 7A, the system 10 then provides the user with an indication that the search has been completed (block 406), and sets a search flag (block 408) indicating that search results are pending.

Upon compilation of a search, the user preferably is afforded several options for displaying the results. For example, the user is offered the opportunity to view the results as thumbnails (block 410), as text (block 414), or as a detailed report (block 418). If the user requests thumbnails (block 410), the internet server 24 will utilize the thumbnail pathnames stored in the item records identified by the search to locate and display thumbnail depictions of the search results on the user's display device (block 412). If the stored data files are not image files, dummy thumbnails in the form of standardized icons will preferably be displayed.

If instead (or subsequently) the user requests a textual display (block 414), the system will display textual information taken from the item records identified in the search for viewing by the user (block 416). Examples of such textual information that could be displayed include: filename, a class field, a sub-class field, a category field, user defined fields, the date in which the file was entered on the system, and/or the size of the file. Of course, other information could also be displayed, if desired, without departing from the scope or spirit of the invention.

Finally, if the user decides to display a report (block 418), the system 10 will request the user to identify the type of report desired. Upon receipt of an appropriate user input, the internet server 24 will generate the requested report and display it on the user's screen (block 420). Although many different types of reports could be generated without departing from the scope of the invention, in the preferred embodiment, the system 10 offers the authorized user an opportunity to view reports concerning the current search results, browsing activity, storage statistics, and/or order transactions.

Regardless of the display format(s) utilized by the user, the user can identify any or all of the data files identified in the search for downloading (block 422). When such a request for downloading is received, the internet server 24 will utilize the pathname(s) in the appropriate item record(s) to locate and download copies of the selected data file(s) (block 424). If the selected data files are image files, low resolution copies of the files will be downloaded.

It bears emphasis that, as the data management system is intended to provide secure and safe storage of data files, the system 10 is preferably adapted to download copies, not originals, of the stored data files. The original stored data files are preferably maintained as read-only files that cannot be changed in the ordinary course. If an image provider user 14 wishes to change a data file, the preferred course is for the user 14 to upload a new modified data file and, if desired, mark the old file for deletion. Alternatively, the old file may be maintained on the system indefinitely.

In accordance with another aspect of the invention, the internet server 24 can be adapted to download selected files in a format selected by the user requesting the file (blocks 423 and 425). For example, a user can optionally be provided with an opportunity to select a file format such as TIFF or CT before downloading a file from the system. As explained above in connection with the autolog routine (FIGS. 4A–4C), the system is preferably provided with a translation matrix including instructions as to how to translate files between commonly used file formats. The internet server can access this translation matrix to translate the file(s) requested by the user prior to downloading.

In any event, after the selected data files have been downloaded, the internet server logs the downloading activity in the activity database (block 426). Next, the internet server checks a flag to determine whether the user has indicated a desire to leave the browse routine (block 428). If so, the system 10 returns to block 116 in FIG. 3A. If not, the system jumps to block 400 in FIG. 7A to determine whether a further search is desired. If the user indicates another search is desired, the system proceeds to block 404 and continues through the browse routine as described above. If a further search is not requested, the system checks the status of the search flag (block 402) to determine whether a search has already been compiled. If not, the system 10 waits for the user to request a search (block 400) or to exit the browse routine (block 403). If a search has already been completed, the system proceeds through blocks 410–428 to enable a user to continue to view the current results and possibly download further files. The search flag is preferably re-set to the "no search" status when the user logs off the system 10.

In any event, when the user exits the browse routine, the system 10 proceeds to block 116 in FIG. 3A. In the typical case, the user who has completed the browse routine and downloaded low resolution images will now log out of the system (block 126). The user can then use the low resolution images on their local system to create a file such as a brochure or web page. In some instances, the user will create a page description language (PDL) file which identifies one or more locations for the downloaded image in the finalized product.

Assuming for purposes of discussion the user has logged out, created a file incorporating an image located in a search of the database, and has now logged back onto the system 10 (blocks 104, 110), the user will then again have the opportunity to enter the browse routine (block 112) to perform further searching; to request delivery of a work order (block 116); or to perform certain administrative tasks (block 120). Assuming the user indicates a desire to place a work order (block 116), the system 10 will call the order routine (block 118) illustrated in FIGS. 8A–8C.

Before proceeding with a description of the order routine, a few definitions should be noted. As used herein, the term "work order" refers to the set of data transmitted from a first user to the host system 10 requesting routing to a second user. The work order preferably includes a set of instructions identifying the second user and identifying any files to be sent from the database. The work order may also include local files created outside of the system such as a PDL file designed to incorporate one or more files from the database. If desired, the work order could also include copies (low resolution or otherwise) of the files in the database which are to be sent to the second user, but such an approach is not presently preferred. However, as used herein, "identifying a file" includes forwarding a name or code specifying a file, and/or forwarding the actual file or a (thumbnail, low-resolution, and/or high-resolution) copy thereof.

As used herein, the term "job order" refers to a collection of data assembled or otherwise developed by the host system 10 for routing to the second user. Preferably, the job order includes any local files forwarded by the user in the work order, and copies of any data files in the database that were identified in the work order by the first user. The job order is preferably developed and routed by the host system 10 in accordance with the instructions contained in the corresponding work order sent by the first user.

Upon entering the order routine, the system 10 will first download a destination and instruction form to the user for completion (block 500). After the user completes this form by identifying the identity of the user who is to receive the work order and adding any desired instructions for the receiving user, the system will temporarily store the destination and instruction form (block 502). Next, the sending user identifies any data files such as high resolution images to be included in the work order (block 504). The system will store the filename of any such file(s) (block 506). The sending user will then add any local files (e.g., files, such as PDL files, created outside the system, typically incorporating data from the database) to be included in the work order (blocks 508–510). If the sending user is satisfied that the order is complete (block 512), he will then cause the work order to be sent to the host site 10 (block 514). Otherwise, the user will be afforded an opportunity to continue to review and revise the work order (block 513) until it is ready to be transmitted to the host site 10.

Upon receiving the work order, the host site 10 develops a job order in accordance with the instructions contained in the work order. The development of a job order is preferably initiated by the internet server 24 which parses the destination and instruction form for the address of the receiving user (block 516). Next, the internet server locates any original data file(s) (such as high resolution image file(s)) identified in the work order (block 518). The original data file(s) and any local documents contained in the work order are then compressed (preferably, pursuant to a user defined algorithm as discussed above in connection with FIGS. 4A–4C) (block 520) and forwarded to the receiving user specified in the destination and instruction form (block 522).

Depending upon the instructions of the sending user, the destination and instruction form will then be e-mailed or faxed to the receiving user to notify the receiving user that a job order is being sent (block 524). If the sending user had previously requested confirmation (block 526), the system will next e-mail a message to the sending user that the order has been compiled, sent to, and received by the specified destination (block 528). Finally, the host site 10 logs the order activity in the activity database (block 530). Activities that are preferably logged include, without limitation, the assembling of a job order; the size of the assembled job order; the date and time the work order was received; the date and time the compiled job order was transmitted; the dates and times the e-mail or fax messages were sent to the receiving user and the sending user; the length of transmission time required for the email or fax transmissions; and whether a confirmation was sent to the sending user.

At block 532 in FIG. 8C, the internet server determines whether the sending user has indicated a desire to exit the order routine. If the order routine is exited, the internet server 24 enters block 120 of FIG. 3B. Otherwise, the system returns to block 500 in FIG. 8A, where, upon receipt of an indication that the user wishes to place another work order, a new destination and instruction form will be downloaded. In the preferred embodiment, blocks 500–514 are performed by the user's local computer system and blocks 516–532 are performed by the host site 10.

In the preferred embodiment, once a work order is received from a sending user, the job order compilation, routing and messaging performed by the system at Steps 516–530 is completely automatic. In other words, once a work order is received by the host site 10, the system 10 preferably performs blocks 516–530 without further human involvement.

After logging onto the system (blocks 104 and 110 of FIG. 3A), a user may choose to perform various administrative tasks on the system (block 120). These tasks include, without limitation, such activities as: obtaining reports; editing item records; removing data files from the system; adding new clients and users to the system; changing the security status of users; and editing the compression scheme or storage format used in the autolog routine (FIGS. 4A–4C). Of course, not all users are authorized to perform all of these tasks. In the preferred embodiment, users are divided into client users, meaning all users not employed by, or otherwise associated with, the owner of the database management system, and system users, meaning those users employed by, or otherwise associated with, the owner of the system. The individuals within these two groups of users are further divided into read-only users and administrative users. As the name suggests, read-only users can view stored data files if given permission by an image provider user, but cannot change the data stored on the system. Administrative users have the ability to edit various files such as item records. These distinctions will be further clarified in the following.

Assuming for purposes of explanation that a user has indicated a desire to enter the administration mode (block 120 of FIG. 3B), the system calls the administration routine (block 124) illustrated in FIGS. 9A–9B. Upon entering this routine, the internet server first determines whether the user is a client-type user or a system-type user (block 600). In the preferred embodiment, this determination is made based on the identification information obtained during the login routine (FIG. 6).

Assuming for the time being that the user is a client-type user, the internet server next preferably presents the user with a pull-down menu presenting options for proceeding. As shown in FIG. 9A, under one option, a user can request the generation of one or more reports of various types (block 610). Representative types of reports that can be requested include, without limitation, activity reporting such as on-line browsing time (broken down on either a per user or per client basis); stored files summaries showing time in-system, storage cost, file size, resolution information, compression information, and/or file type; new image input summaries for a given time period; lists of orders pending and processed; file purge reports showing the files purged from the system in a given time period; and invoices. Of course, users can only gain access to such information if authorized by an image provider user 14, and preferably image provider users 14 can only access, and authorize access to, their own files and data relating to their own files. In any event, if a report is requested and the user is permissioned to access the data needed to generate the report (block 611), the internet server generates and downloads the report (block 612). If the user is not authorized to access the information in the requested report (block 611), a denial message is displayed (block 613).

If a user selects the edit item record option in the graphical user interface (block 614), the internet server first determines whether the user is a read-only type user or an administrative user (block 616). If the user is a read-only type user, a denial message is generated and displayed (block 617) to the user. Otherwise, the item record the user wishes to edit is accessed and downloaded to the user. After the user makes the desired changes, the edited item record is saved (block 618). These blocks (614–618) can be used by an image provider user 14 to catalog its files by entering data into the user defined fields of the item records described above.

These fields preferably include a class field, a sub-class field, a category key field and up to ten user defined fields. Each class record can preferably have one or more sub-class records keyed to it.

As discussed above, when a user puts new data files on the system via the autolog routine, those files are automatically processed and stored on the system. However, those files are preferably not searchable until a further affirmative authorization is received from the image provider user 14. This arrangement affords the image provider user an opportunity to edit the item records of its new files such that its new files are cataloged into its library of files in an organized and searchable fashion. After editing new item records through blocks 614–618, a user can preferably authorize those records for searching with a simple command.

If a user selects the remove item option at the graphical user interface (block 620), the internet server first determines whether the user is a read-only-type or an administrative-type user (block 622). If the user is a read-only-type user, a denial message is generated (block 624). Otherwise, the user is permitted to view the item records associated with the data files of the authorizing image provider user 14, and to selectively mark data files for purging (block 626). To avoid erroneous loss of data, the system preferably provides a grace period before these marked files are purged. During that grace period, authorized users can "unmark" any marked files, and thereby save such files from deletion. In the preferred embodiment, the grace period is 1 month.

At block 628 of FIG. 9B, the internet server 24 updates the activity database as appropriate. If the user wishes to exit the administrative routine (block 630), the system returns to block 126 of FIG. 3B. If not, the internet server continues to process further report requests (block 610), item record update requests (block 614), or purge requests (block 620).

If at block 600 of FIG. 9A, the internet server determines that the user is a system-type user, the internet server proceeds to blocks 632–646. In particular, the internet server accepts inputs from a system user entering new image provider users 14, or entering new users for particular pre-existing image provider users 14 (blocks 632 and 634); changing the security status of users between the read-only and administrative status and vice versa (blocks 636 and 638); editing item records (blocks 640–642); and editing the autolog configuration of image provider users by setting compression algorithms and compression values or setting format types. When the user indicates that it has completed its administrative tasks (block 630), the system returns to block 126 of FIG. 3B. As shown in FIG. 2, at least one administrative workstation 8 is preferably connected to the LAN 18 for use by system users.

Although changing security status (blocks 636–678), adding new users (blocks 632–634), and editing the autolog configuration (blocks 644–646) have been illustrated in FIGS. 9A–9B as functions exclusive to system users, those skilled in the art will appreciate that in some preferred embodiments these functions (other than adding image provider users 14) can also be made available to image provider users 14 and the users they authorize. Similarly, although requesting reports (blocks 610–613) is shown as a function exclusive to authorized client users, in some embodiments, system users may also perform these functions. In instances where reports are generated (block 612), they can be displayed on a display device and/or sent to hard-copy generating devices without departing from the scope of the invention and regardless of the type of user requesting the report.

If after returning from the administrative routine the database management system determines that the user is logging out (block 126), the internet server records the log out time on the activity database (block 128) and returns to block 102 in FIG. 3A. Otherwise, the internet server continues to await receipt of the browse input (block 112), the order input (block 111), or the administration input (block 120) from the logged-in user.

As mentioned above, the database management system periodically calls a housekeeping routine (blocks 102 and 103 of FIG. 3A). Turning to FIG. 5, the administrative workstation begins the housekeeping routine by generating an invoice for each of the image provider users 14 (block 700). These invoices are developed by reference to the activities logged in the activity log during a pre-defined billing period. Predefined ones of the events are assigned a charge by the system. All of the charges for a given image provider user 14 are preferably automatically organized and displayed in an invoice. The completed invoices are then automatically routed via facsimile or e-mail to the users responsible for payment (block 702). Preferably, the invoices are routed to the appropriate users by the mail server 26 and the communication server 22. The addresses are preferably automatically retrieved from the mail database, and inserted into the invoices. Preferably, the billing process is performed once a month, but other billing periods can also be utilized if desired. Also, invoices preferably include charges for unpaid bills from prior billing periods.

Those skilled in the art will appreciate that many billing arrangements can be employed without departing from the scope of the invention. However, in the preferred embodiment charges are assessed for the following events: a) time spent browsing files; b) storing files; c) downloading OPI or other low resolution format files; d) data file entry; e) work order transactions; f) document transfers; and g) time spent performing administrative services. Browsing charges can be assessed for all of the time users spend logged on to the host system 10, or only for time actually spent in the browse routine. Due to the user's ability to select compression routines, storage charges are preferably assessed on a per-file basis and a per-megabyte basis. For example, in the preferred embodiment, charges of $0.33/per file plus $0.13/MB are assessed for file storage. Due to their special nature, special charges are preferably applied to downloading OPI or other low resolution format files. Preferably a flat fee per download is assessed. Data file entry charges are charges assessed for autologging new files. Preferably, these charges are on a rate per file plus rate per megabyte basis. Order transaction charges are charges assessed for assembling and routing job orders between users. Preferably, those charges are assessed on a rate per file plus rate per megabyte basis such as $6.00/file plus $1.00/MB. Document transfer charges are charges assessed for downloading images or routing documents between users without compiling a job order. Preferably, charges for these services are on a rate per file plus rate per megabyte basis such as $2.00/file plus $1.50/MB. Administration charges are charges assessed for the time spent by system users on image provider user projects such as adding new users, changing security status, editing item records and editing autolog configurations. These charges are preferably assessed on a rate per hour basis such as $150.00/hr.

Returning to FIG. 5, the housekeeping routine is completed by updating the databases, such as the activity database, to record invoicing of the services and by preparing for further activity (block 704). Upon completion of the housekeeping routine, the system returns to Step 104 of FIG. 3A where it continues to operate as described above.

The overall functional flow and architecture of the software of a preferred embodiment of a database management system constructed in accordance with the teachings of the invention are shown generally in FIGS. 10A–10J. In the interest of brevity, the following description will refer back to, and rely upon, the above description of the operating scheme of the overall system wherever possible.

Figure 10A:
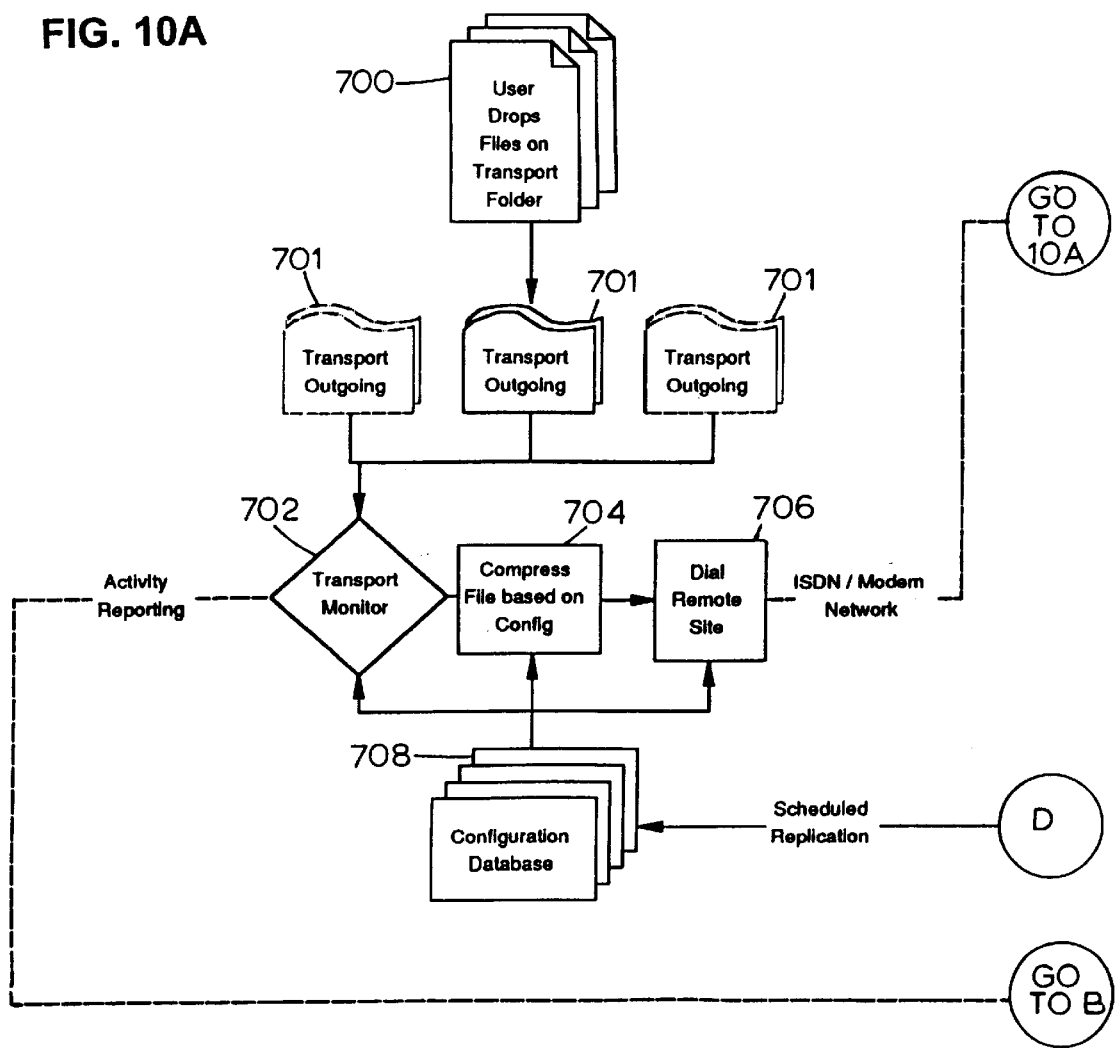

FIG. 10A shows generally the initiation of the autolog routine at a user site such as the offices of an image provider user 14. As illustrated in FIG. 10A, the database management system is preferably provided with a hot-folder transport system licensed from ION Publishing of Bethesda, Md. The hot-folder transport system provides a highly efficient and automatic means for transferring files. Specifically, the hot-folder transport system provides a graphical user interface wherein one or more folders, each of which is associated with a particular destination or sending site, is displayed to a user. By simply dragging and dropping an icon representation of a file onto a destination folder, a user can transmit that file to the predetermined destination associated with the destination folder. The hot-folder system constantly monitors all configured folders for files. Configured destination folders hold settings identifying the destination dropped files are to be sent; the location and type of network connection (dial-up or direct) that is to be established; the service profile identifier, if it is a dial-up data connection; and the proper user identifier and password for access to the remote site for transmitting files.

When a file is detected in a destination folder, the hot-folder system automatically moves the file to a processing queue, and then compresses the file per predetermined compression settings. The communication portion of the local computer then establishes a connection with the host site 10 or other destination by automatically dialing or sending a network request; establishes a valid communication link; passes identification information to the destination computer; and, once the communication link is established, transmits the file. The file remains stored in a temporary file associated with the hot-folder system at the sending site until complete transmission and acknowledgement occur. The transmitted file will then appear in a receiving folder at the destination site. By selecting a receiving folder, a user at the destination site can access the transmitted file.

Of course, a user can have multiple destination and receiving folders configured on their local system. Three destination folders 701 are shown in FIG. 10A.

Returning to FIG. 10A, the transmitting operation of the hot-foldering system is illustrated by blocks 700–708 in the context of an image provider user forwarding a new digital image to the host system 10 for storage. After a user drops the image file on the destination folder 701 associated with the host site 10, the hot-foldering system takes over. The hot-foldering system, which monitors the destination folders (block 702) compresses the image file pursuant to the predetermined user selected settings in the local configuration database 708 and, then, also based on the information in the configuration database 708, establish a connection with the host site 10 (block 706). The image file is then transmitted to the host site 10.

As shown in FIG. 10B, upon receiving the digital image file (block 710), the hot-foldering software at the host site 10 automatically decompresses the file (block 712) and stores it (block 714) to a receiving folder 716. The decompression and routing to the appropriate receiving folder 716 is performed pursuant to predetermined settings in the configuration database 720 at the host site 10. The image file remains in a receiving folder 716 until the autolog server 34 is free to process the file.

When the autolog server 34 is available, the autolog routine will be called (block 718). The autolog routine is then performed as described above in connection with FIGS. 4A–4C. As the autolog routine proceeds, the activity database 725 (shown in FIG. 10E) is updated by the autolog server 34 to log the arrival of the new file; a new item record is stored in the image database 727; if the new file is an image file, a thumbnail representation of the new file is stored in the image database 727 with the item record, and a low resolution image is stored in the file system 729 (FIG. 10E); the original copy of the new file is stored to the file system 729; and, if an OPI or other special low resolution format file is created, it is stored to the file system 729. The file system 729 corresponds to the image database, and is implemented by the SQL database and file storage servers 30, 28.

Figure 10C:
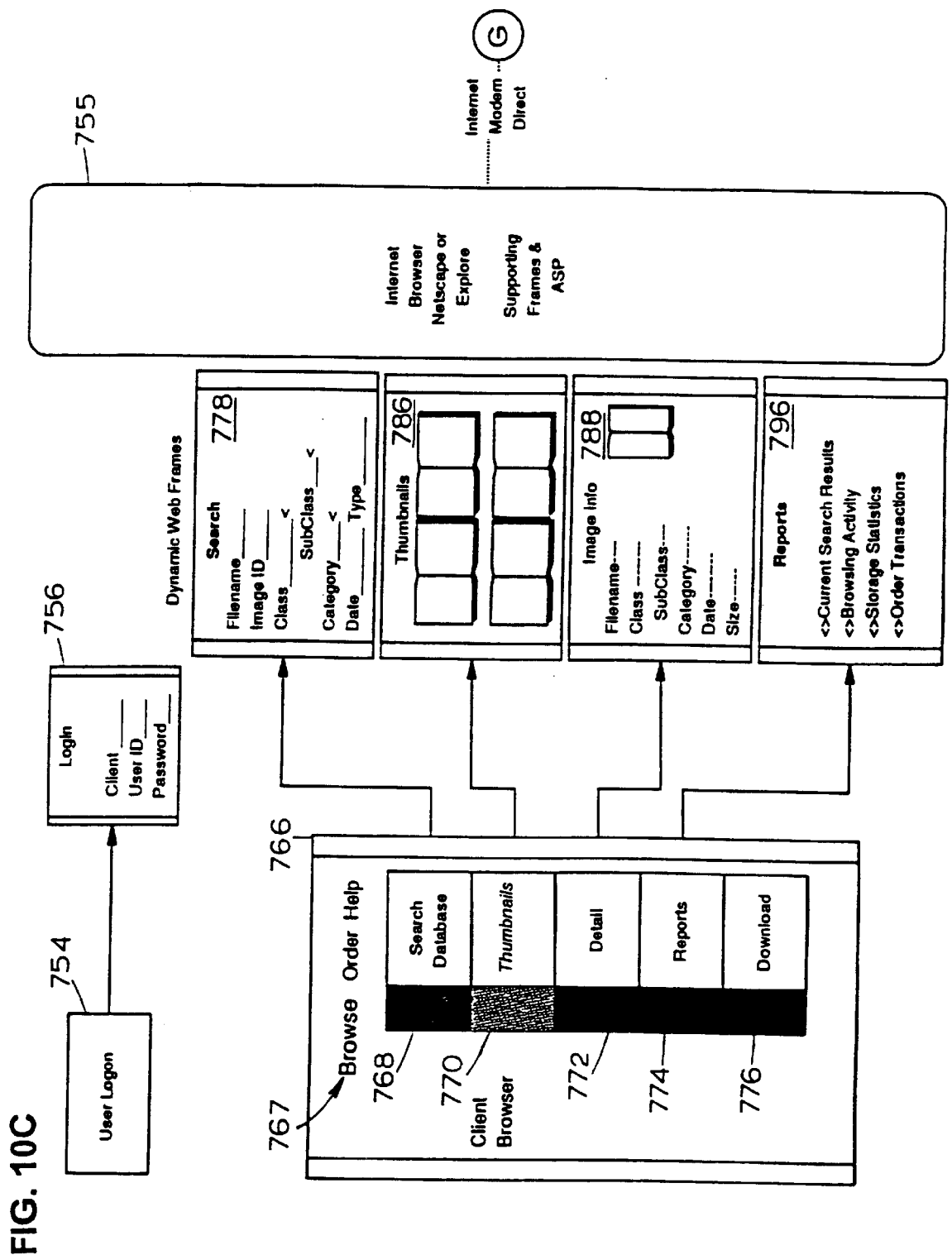
Figure 10D:
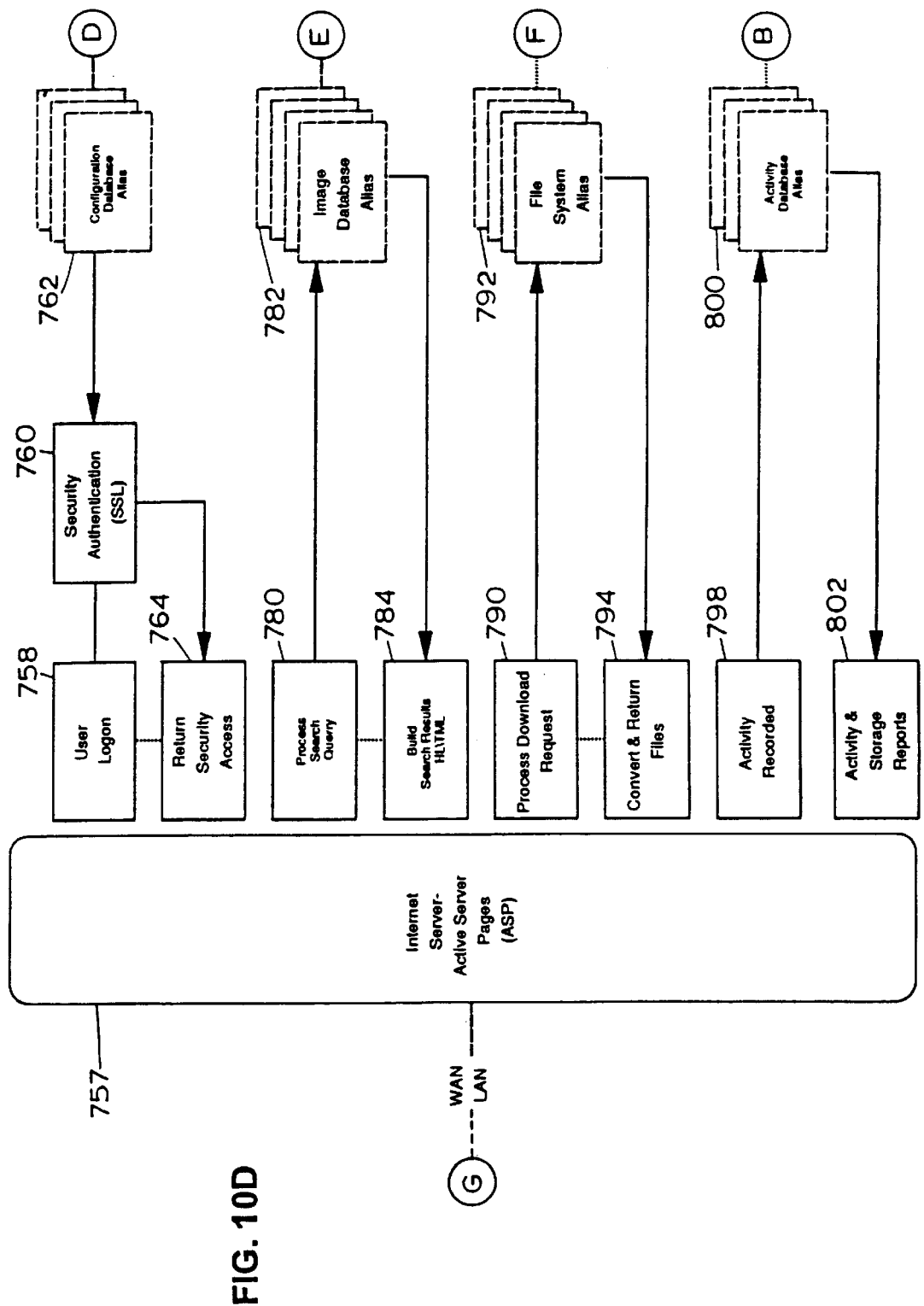
Figure 10E:
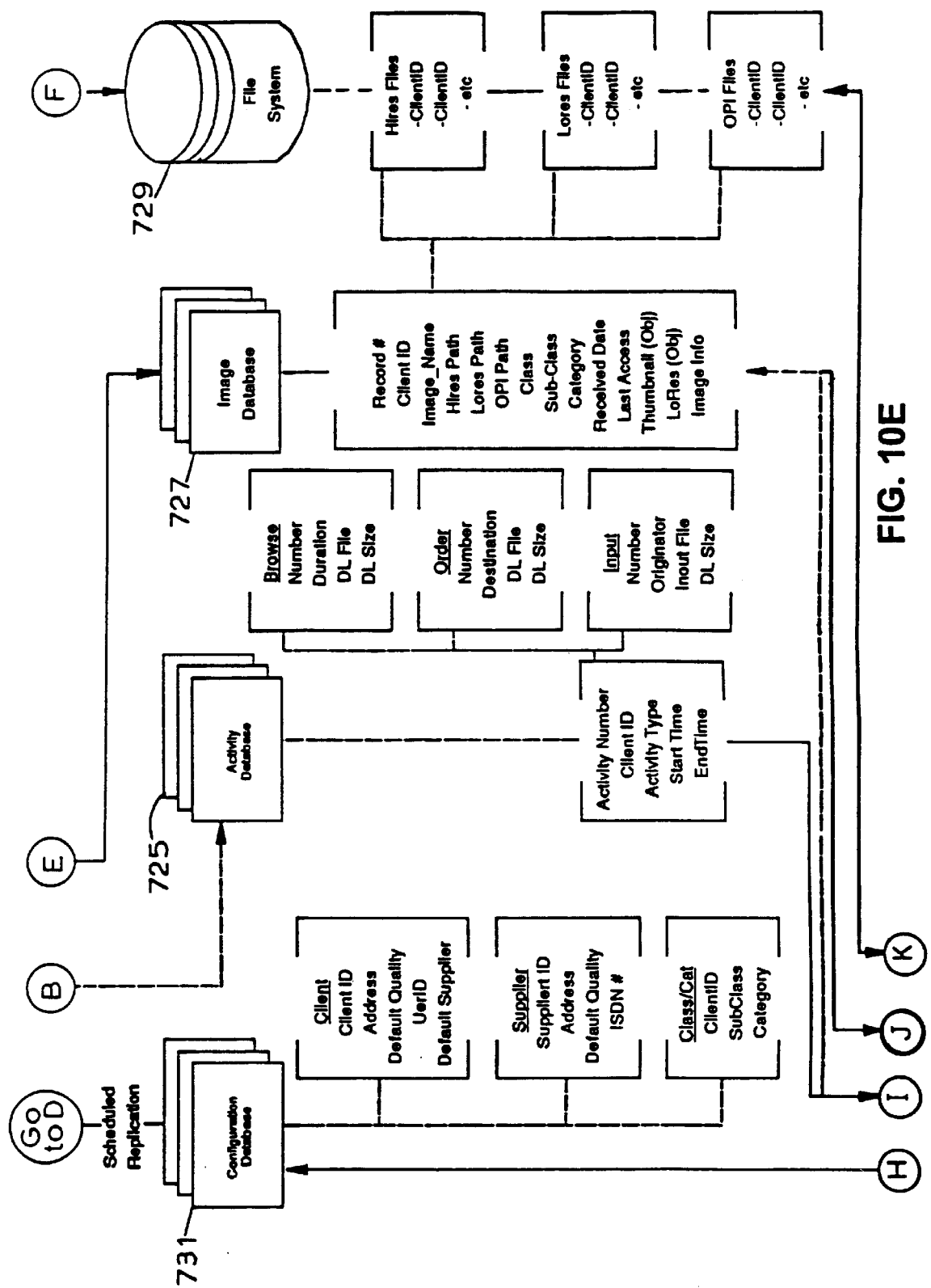
Figure 10F:
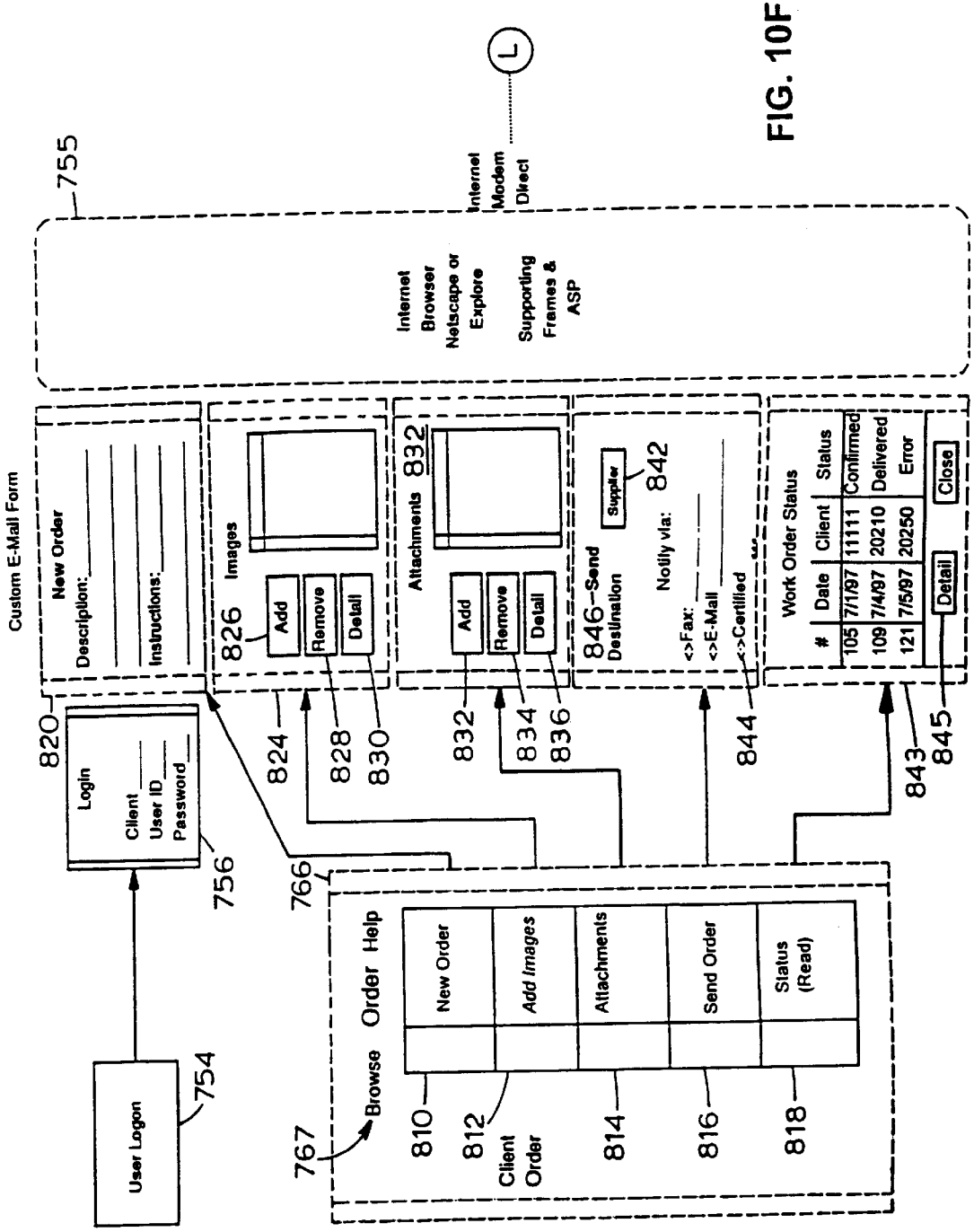
Figure 10G:
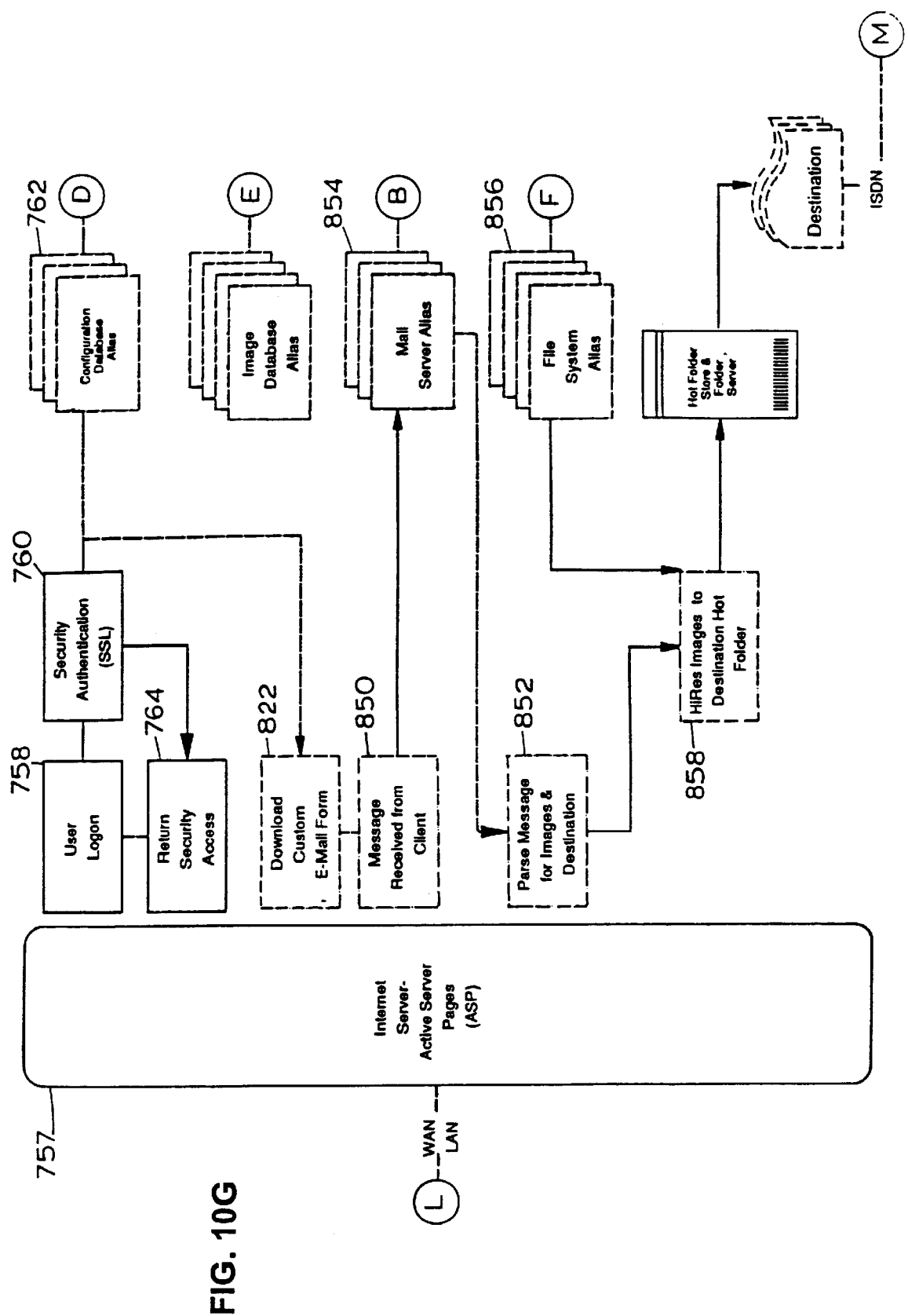
Figure 10H:
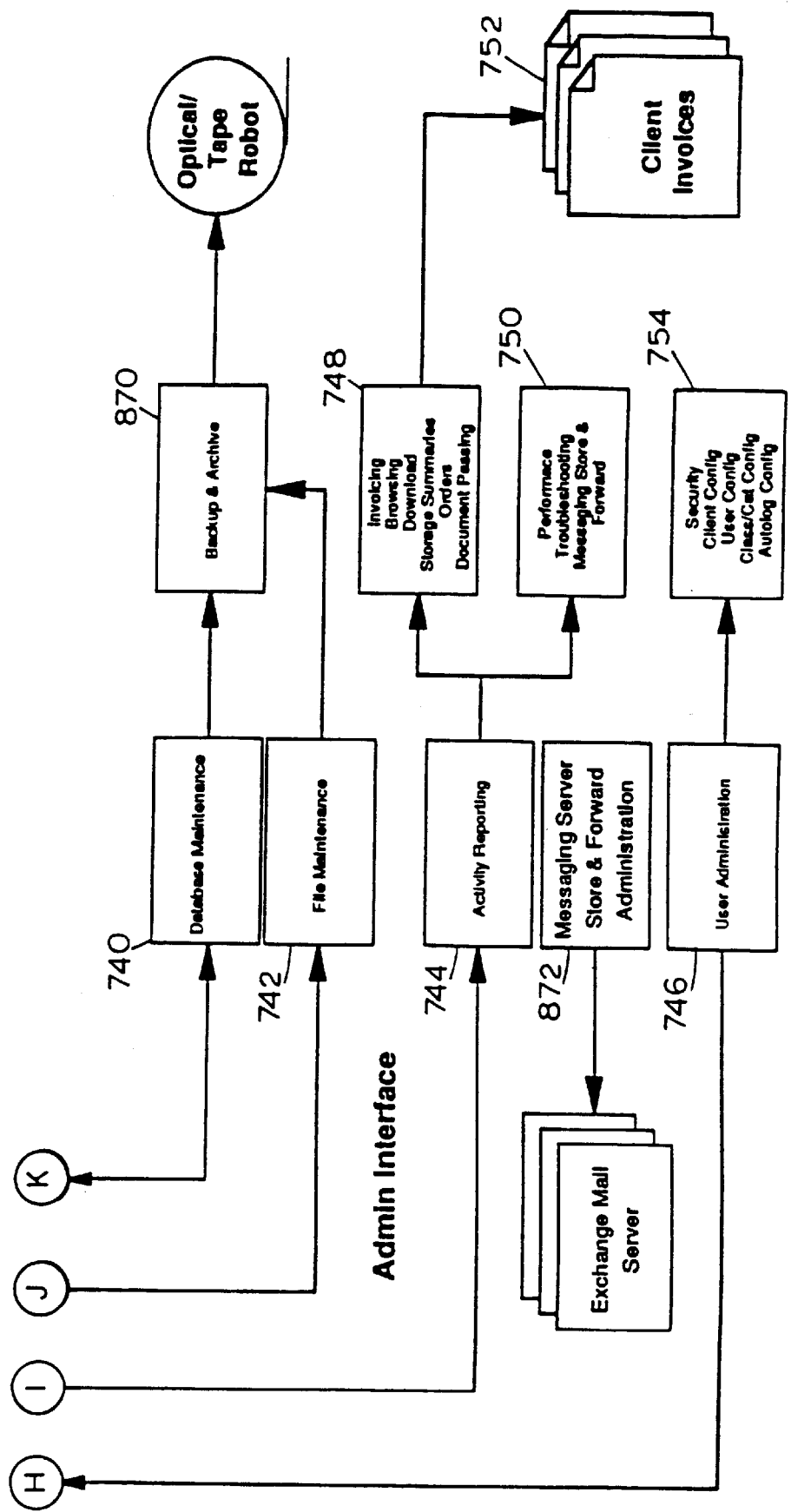
Figure 10I:
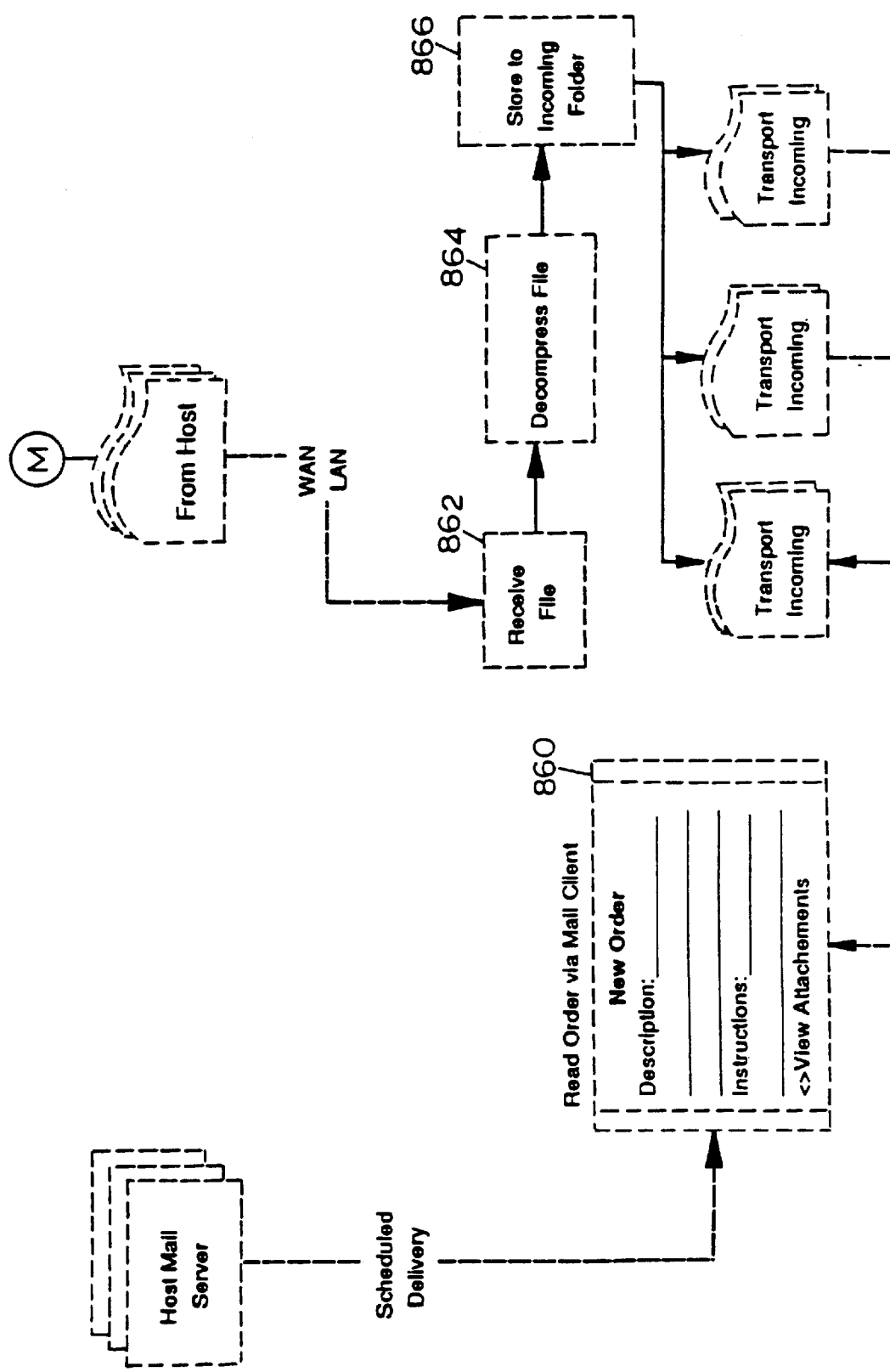
Figure 10J:
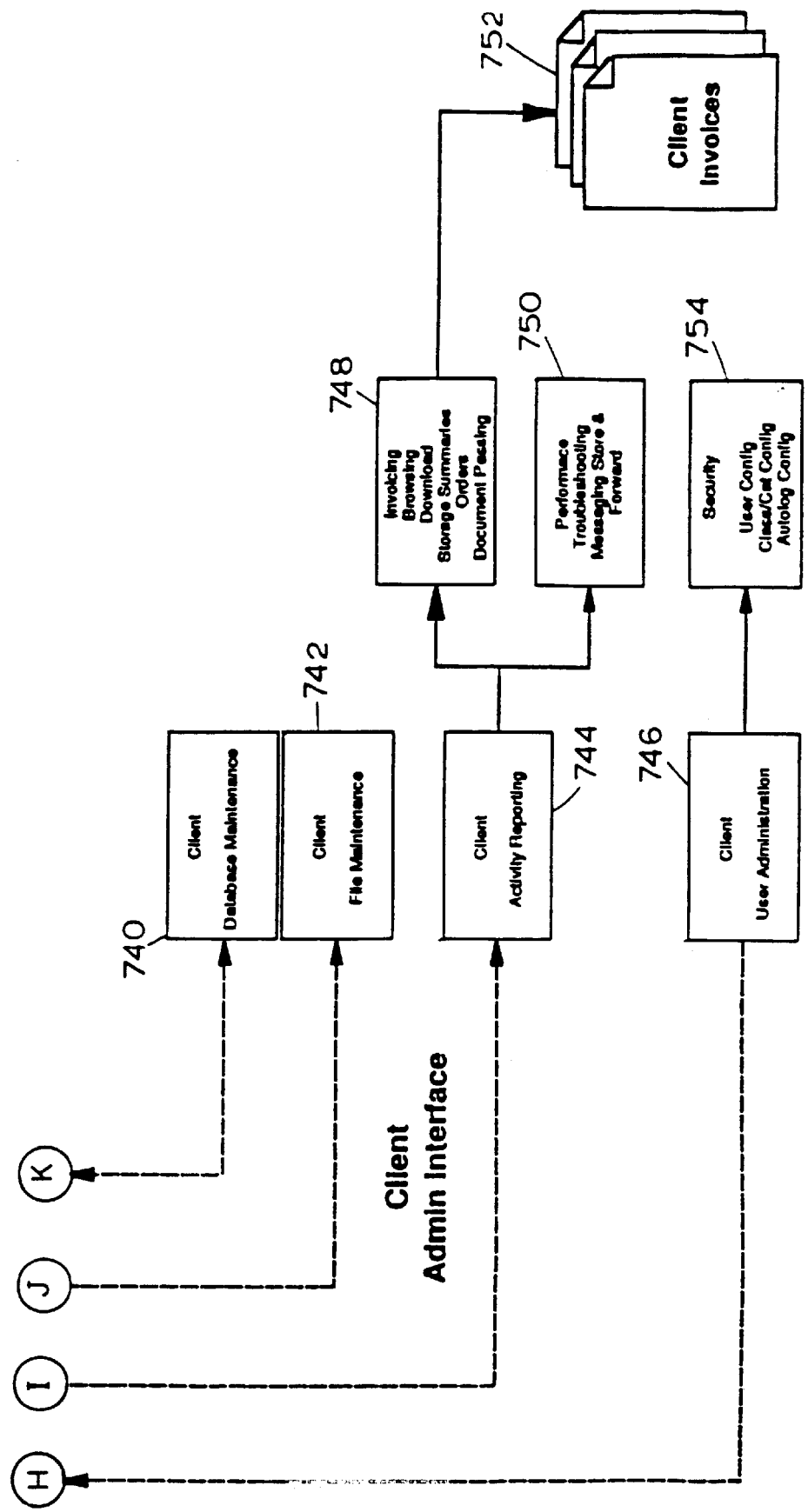

As shown in FIG. 10J, if authorized, a user can access the host site 10 to perform various administrative functions. Typically, the image provider user 14 will have the highest authorization and will be the user-type performing these administrative activities most frequently. As shown in FIG. 10J, authorized users can access the file system 729 to perform database maintenance (block 740) such as marking files for purging, unmarking files previously marked for purge, and editing data records. Authorized users can also access the image database 727 to perform file maintenance (block 742) such as updating item records. Additionally, authorized users can access the activity database 725 to obtain records and reports (block 748), or to perform troubleshooting (block 750). As part of the troubleshooting feature, the user is preferably able to store and forward messages to personnel at the host site 10 who can address technical and billing questions. This feature can also be used to route messages to other users on the system. As shown in FIG. 10J, the reports requested by the user can be downloaded as hard copies or displayed on a video display device (block 752). Finally, authorized users can access the configuration database 731 (block 746) to perform administrative activities such as adding new users, changing parameters such as compression and file format information for use in the autolog routine; and adjusting security clearances for users. Of course, in any of the above scenarios (blocks 740, 742, 744, 746) user access is preferably strictly limited such that a user can only access information to which it has been affirmatively granted access. For example, image provider user A and the users it authorizes, will preferably not have access to the information of image provider user B, unless image provider user B has expressly authorized such access.

In the event a user wishes to download an image for use in the creation of a document or the like, the user would first log in (block 754). As shown in FIG. 10C, the user logs on by establishing a communication connection with the host system 10 through an internet browser such as Netscape or Microsoft Explorer, or through any of the other connections described above (755). The internet server or communication server establishes the connection at the host site 10 (block 757 in FIG. 10D). Once the connection is established, the user attempts to log in by entering a client name, a user identification name, and a password (block 756). As shown in FIG. 10D, the host site 10 receives this data (block 758) and authenticates it (block 760) by comparing it to the data stored in the configuration database (762). Subsequently, the system notifies the user of a denial or acceptance of the log in attempt (block 764).

Assuming that a proper log in has been performed, the user will be provided with an option screen 766. As shown in FIG. 10C, the options screen 766 includes a menu 767 across the top of the screen. This menu preferably includes "Browse", "Order" and "Help" selections. In FIG. 10C, the "Browse" selection has been chosen and is, thus, shown in bold type. When one of the menu options is selected, a pull-down menu is preferably provided. A preferred pull-down menu for the "Browse" selection is shown in FIG. 10C. A preferred pull-down menu for the "Order" selection is shown in FIG. 10F.

Assuming for the moment that the user wishes to browse the image database to which it has been granted access, the user is presented with the five options shown in FIG. 10C, namely, "Search database" 768, "Thumbnails" 770, "Details" 772, "Reports" 774, and "Download" 776. As no search has yet been performed in this example, the only active options are the "Search Database" option 768 and the "Reports" option 774. Upon selecting the "Search Database" option, a search request screen 778 will be displayed. As shown in FIG. 10C, the search request screen 778 provides the user with an opportunity to define parameters for a search. In the preferred embodiment, those parameters include: the filename of a desired file, if known; an image ID of a particular stored image, if known; the class, subclass, and/or category of the type of data desired; the date on which the file was saved; and the type of file. The user must fill in at least one of these parameters to initiate a search. Upon receiving the desired parameters, the host site 10 processes the search query (block 780, FIG. 10D), accesses the image database 727 (block 782), and builds search results (block 784).

The user can now select a display format for the search results. If the user selects the "Thumbnails" option 770, the thumbnail images corresponding to the item records identified in the search will be displayed 786. If the user selects the "Details" option 772, selected fields from the item records identified in the search along with a corresponding thumbnail for each such item record will be displayed one at a time 788.

Regardless of the viewing format chosen, the user can select an image for downloading by clicking on a corresponding thumbnail and selecting the "Download" option 776. The host site 10 processes the download request (block 790) by accessing the file system 729 (block 792) and downloading low resolution copies of the requested files (block 794) to the requesting user. The user can then log off and develop one or more documents using the downloaded image(s).

As mentioned above, the user can also select the "Reports" option 774 to obtain statistical and billing information reports. If the "Reports" option 774 is selected, the reports screen 796 providing a further menu of options is displayed. As shown in FIG. 10C, that menu can include options such as "Current Search Results", "Browsing Activity", "Storage Statistics", and "Order Transactions". If any of these selections are made, the system 10 processes the activity request (block 798), accesses the activity database 725 (block 800), compiles and downloads the requested report (block 802). As mentioned above, these reports can be viewed on a video screen at the user site or downloaded to an output device such as a printer at the user site.

Assuming a user has created a file including an image downloaded from the host site via the "Browse" menu described above in connection with FIGS. 10C–10D, a user can place a work order and request that it be delivered to a second destination for publishing or the like. To this end, a user would first log in to the host site 10 in the manner described above in connection with FIGS. 10C–10D.

Assuming a successful log in has occurred, the user is presented with the options screen 766 described above. In FIG. 10F, the "Order" selection is shown in bold type because it has been selected. As a result of this selection, a new pull-down menu with the options "New Order" 810, "Add Images" 812, "Attachments" 814, "Send Order" 816, and "Status (Read)" 818 is displayed. Since the user has just logged on, only the "New Order" and "Status (Read)" selections 810, 818 are available.

If selected, the "Status (Read)" selection 818 will cause status screen 843 to be displayed. As shown in FIG. 10F, screen 843 displays the status of any recently place work orders. Preferably, the screen displays a unique number associated with the order for tracking purposes, the date the order was placed, an identification number associated with the client under whose authorization the order was placed, and the status of the order. Preferably, the status category will indicate that the order is in transit, the order has been delivered, confirmation has been sent to the sending user, that a unread message related to the order is pending, or that an error has occurred. Unread messages are messages from the host site 10 concerning the work order. These messages can be viewed by selecting the appropriate order on the status screen 843 and clicking the "detail" button 845 shown in FIG. 10F.

Assuming for purposes of explanation, the user wishes to place an order and selects the "New Order" option 810, the host site 10 downloads a custom e-mail form 820 (block 822 in FIG. 10G). If desired, the user will then fill in the e-mail form 820 with a short description and instructions for the receiver of the job order at the second destination. The user may then select the "Add Images" option 812, whereupon screen 824 will be displayed. The software is preferably configured to display the filenames of all recently downloaded images. The user can select one or more images from this list to be included in the work order by highlighting the desired filenames and clicking on "Add" 826. If the user wishes to remove filenames from the list, the user would select the filename to be removed and click on the "Remove" icon 828. Additional details about the files named in the list can be displayed by clicking on the desired filename with a mouse or other input device and selecting the "Detail" option 830.

The user may also specify attachments to be included in the work order by selecting the "Attachments" option 814. Examples of attachments which might be included in a work order include page description language files prepared using Quark® Express or some other publishing program. In any event, the attachments screen 832 will be displayed when the "Attachments" option 814 is selected. The user can select the "Add", "Remove" or "Detail" icons 832, 834, 836 to respectively add attachments to the list, remove attachments from the list, and display detailed information concerning files appearing on the list.

When the work order is accurate and complete, the user will select the "Send Order" option 818 to display the send screen 840. The user can then select a destination from a list of jobbers 16 such as publishers obtained by clicking the "Supplier" icon 842. The user will also choose the method to notify the selected jobber/supplier 16 that a job has been sent. In the preferred embodiment, that notification can be by facsimile or e-mail. If the "Certified" option 844 is selected, the sending user will automatically receive an acknowledgement that the notification was successfully transmitted to the jobber. The user can then send the work order by selecting the "Send" option 846.

When the "Send" option 846 is selected, the user's computer will prepare the work order by locating any attachments; preparing a data file including the supplier name, the e-mail form, and the filenames of the images in the work order; and compressing the work order for efficient transmission. The user's computer will then send the work order to the host site 10.

As shown in FIG. 10G, upon receipt of the work order (block 850), the host site 10 will parse the work order for the identifications of images to be included in the job order and the name of the supplier 16 (block 852) to receive the job. The address of the jobber 16 will be located in the configuration database 731 (block 854) and high resolution copies of the identified files will be downloaded from the file system 729 (block 856). The assembled job order including the high resolution copies of the images selected by any user and the user created attachments such as PDL files, will then be automatically transferred to a sending hot-folder associated with the selected destination (block 858). The hot-folder transport system will then take over, compressing the job order and transferring the job order to the selected destination as described above in connection with FIG. 10A. Specifically, the hot-folder system compresses the work order in accordance with the user-defined algorithm stored in the configuration database; establishes a connection with the destination site by automatically dialing or sending a network request; establishes a valid communication link; passes log in information; and transmits the job order. The job order remains stored on the host system 10 until it is completely transmitted and an acknowledgement is received. After the job order is sent, the host system 10 logs off and records the transmission activity to an activity log tracking file in the activity database. The transmission is also logged in the activity database for later billing.

The host site then faxes or e-mails the e-mail form prepared by the sending user to the jobber 16 to provide notification that a job order has been transmitted. If the user requested certification, a message confirming successful transmission of the e-mail or fax will be sent back to the sending user by the host site 10.

Turning to FIG. 10I, the destination user/supplier 16 receives the fax or e-mail notification of the job order transmission (block 860) from the mail server 26 of the host site 10. As shown in FIG. 10I, the hotfoldering software at the jobber site 16 will have preferably already received the job order (block 862); decompressed the job order (block 864); and stored the job order to the appropriate incoming folder (block 866). The jobber 16 can then access the job order by clicking on the appropriate incoming folder icon. The e-mail description and instruction form can be stored on the supplier's local computer or printed out as desired.

As shown in FIG. 10H, administrative tasks can be performed by system employees at the host site 10. Thus, authorized users can perform database maintenance 740 and file maintenance 742, including purging files and backing-up the system databases (block 870). The system users can also perform activity reporting (block 744) including, by way of example, invoicing, browsing, downloading, report generating, document passing and troubleshooting, as shown in blocks 748 and 750. The system users may also perform user administration functions (block 746) such as adding or deleting clients; adjusting security clearances; adding or deleting users; editing item records; and editing autolog configurations (block 754). Finally, as shown in FIG. 10H, the host site 10 can store and forward messages between users and between users and the host site (block 872) via the mail server 26.

In an optional embodiment, the host site 10 is configured to automatically set up hot-folders on the local systems of affected users when new users or new relationships between users are established. For example, if Client A adds new user B to the system and wants new user B to have hot-folder connections to Client A's offices and Supplier B and C's facilities, the system 10 automatically connects to, and creates, receiving and sending hot-folder files on the local systems of Client A, User B, and Suppliers B and C. This scheduled replication is shown in FIGS. 10A, 10B and 10E as automatic modifications to the local configuration databases of the users and host site 10.

Those skilled in the art will appreciate that, although the invention has been described in the context of certain preferred embodiments, many modifications can be made thereto without departing from the scope or spirit of the invention. For example, while in the above embodiments the host site 10 has been described as a single location, the host site 10 can be distributed across multiple geographic locations. Multiple sites can be used, for example, to provide quicker access and lower telecommunication cost to frequently used files. Also, the host site can provide a mirroring storage system for the databases at a remote facility in a separate geographic location for security and disaster recovery purposes. Further, while the database management system has been described in the context of users located in separate geographic locations, those skilled in the art will readily appreciate that the host site 10 and users 12, 14, 16 can all be located within a single building or organization without departing from the scope of the invention.

Those skilled in the art will further appreciate that, among other significant advantages of the disclosed database management and order delivery system, the disclosed system advantageously provides an intelligent order delivery system which achieves an automatic, integrated workflow for transferring digital assets between multiple users.

Those skilled in the art will further appreciate that although, for ease of explanation, the steps performed by the system were described as occurring in a particular time sequence, the operation of the system is not limited to any temporal arrangement. On the contrary, the noted operations can be performed in any order without departing from the scope or spirit of the invention.

Finally, those skilled in the art will further appreciate that, although the invention has been described in connection with certain embodiments, there is no intent to limit the invention thereto. On the contrary, the intention of this application is to cover all modifications and embodiments fairly falling within the scope of the appended claims either literally or under the doctrine of equivalents.

What is claimed is:

1. A method for printing digital images, the method comprising the steps of:

uploading a first high resolution digital image from a first image provider to an electronic storage facility;

receiving and storing the first high resolution digital image at the electronic storage facility;

permitting the first image provider to identify users who can access the first high resolution digital image stored at the electronic storage facility;

receiving first login information from a first user, the first login information including a first user identification name and a first password;

determining if the first login information is associated with a user identified by the first image provider;

generating a low resolution copy of the first high resolution digital image;

if the first login information is associated with a user identified by the first image provider:

(a) transmitting the low resolution copy of the first high resolution digital image to the first user via the Internet;

(b) detecting a selection made by the first user, the selection made by the first user identifying the low resolution copy of the first high resolution digital image; and (c) printing the first high resolution digital image in response to detecting the selection made by the first user;

uploading a second high resolution digital image from a second image provider to the electronic storage facility;

receiving and storing the second high resolution digital image at the electronic storage facility;

permitting the second image provider to identify users who can access the second high resolution digital image stored at the electronic storage facility;

receiving second login information from a second user the second login information including a second user identification name and a second password;

determining if the second login information is associated with a user identified by the second image provider;

generating a low resolution copy of the second high resolution digital image;

if the second login information is associated with a user identified by the second image provider:

(a) transmitting the low resolution copy of the second high resolution digital image to the second user via the Internet if the second login information is valid;

(b) detecting a selection made by the second user, the selection made by the second user identifying the low resolution copy of the second high resolution digital image; and (c) printing the second high resolution digital image in response to detecting the selection made by the second user;

maintaining transparency of the first high resolution digital image to the second user; and maintaining transparency of the second high resolution digital image to the first user.

2. A method as defined in claim 1 wherein the first image provider is a user identified by the first image provider.

3. A method as defined in claim 1 wherein a user different from the first image provider is a user identified by the first image provider.

4. A digital image management system comprising:

an electronic storage facility for providing storage for high resolution digital images of a plurality of unrelated image providers, at least some of the high resolution digital images stored in the electronic storage facility being used to develop corresponding low resolution copies, each high resolution digital image having a higher bandwidth communication requirement than each of the corresponding low resolution copies, the electronic storage facility storing the high resolution digital images of a first one of the image providers such that the high resolution digital images of the first image provider can only be accessed by authorized users identified by the first image provider and such that the high resolution digital images of the first image provider are transparent to other unrelated image providers that are not authorized by the first image provider, the high resolution digital images stored in the electronic storage facility being received via the Internet, means for allowing an authorized user identified by the first image provider to download a particular low resolution copy from the electronic storage facility to a first location;

means for accepting a work order from the authorized user at the first location wherein the work order identifies a particular high resolution digital image corresponding to the particular low resolution copy;

job order development means responsive to the accepting means for developing a job order including the particular high resolution digital image; and means for electronically routing the job order to a printer.

5. A digital image management system as defined in claim 4, further comprising image handling means for processing the high resolution digital images to develop the corresponding low resolution copies.

6. A digital image management system as defined in claim 4, further comprising a mail database, the mail database including a conventional address for the authorized user.

7. A digital image management system as defined in claim 4 wherein the first image provider is an authorized user identified by the first image provider.

8. A digital image management system as defined in claim 4 wherein a user different from the first image provider is an authorized user identified by the first image provider.

9. A digital image management system comprising:

an electronic storage facility for providing storage for digital images of a plurality of unrelated image providers, at least some of the high resolution digital images stored in the electronic storage facility being used to develop corresponding low resolution copies, each high resolution digital image having a higher bandwidth communication requirement than each of the corresponding low resolution copies, the electronic storage facility storing the high resolution digital images of a first one of the image providers such that the high resolution digital images of the first image provider can only be accessed by authorized users identified by the first image provider and such that the high resolution digital images of the first image provider are transparent to other unrelated image providers that are not authorized by the first image provider, the high resolution digital images stored in the electronic storage facility being received via the Internet;

a search engine for searching among digital images stored in the storage device;

a communication device operable to allow remote communication by a user with the digital image management system including means for sending a particular low resolution copy of a particular high resolution digital image to the user in response to a request therefor;

means for accepting a user defined work order from a first location via the communication device wherein the work order identifies the particular low resolution copy of the particular high resolution digital image; and a router for electronically routing a job order to a printer, the job order including the particular high resolution digital image associated with the particular low resolution copy identified in the work order.

10. A digital image management system as defined in claim 9 wherein the first image provider is an authorized user identified by the first image provider.

11. A digital image management system as defined in claim 9 wherein a user different from the first image provider is an authorized user identified by the first image provider.

12. A digital image management and delivery system comprising:

a storage device for providing storage for digital images of a plurality of unrelated image providers the storage device storing the digital images of a first one of the image providers such that the digital images of the first image provider can only be accessed by authorized users identified by the first image provider and such that the digital images of the first image provider are transparent to users that are not authorized by the first image provider, the high resolution digital images stored in the storage device being received via the Internet;

a searching engine for developing a subset of the digital images stored in the storage device by the first image provider in response to inputs received from a first authorized user identified by the first image provider, the searching engine being adapted to download low resolution copies of the subset to the first authorized user; and a router for electronically routing at least one high resolution copy of a digital image contained in the subset and identified by the first authorized user to a printer.

13. A system as defined in claim 12 wherein the digital images are input to the system by the first image provider via a communication device.

14. A system as defined in claim 13 further comprising an image handler for processing the digital images input by the first image provider, the image handler being adapted to develop low resolution images of the digital images received from the first image provider and to store both the digital images received from the first image provider and the low resolution images thereof in the storage device in an addressable fashion for future searching.

15. A digital image management system as defined in claim 12 wherein the first image provider IS an authorized user identified by the first image provider.

16. A digital image management system as defined in claim 12 wherein a user different from the first image provider is an authorized user identified by the first image provider.

17. A method of managing digital images comprising the steps of:

receiving a plurality of digital images from a first image provider via the Internet;

storing a high resolution and a low resolution copy of each of the first plurality of digital images provided by the first image provider in an electronically searchable format on a storage device;

receiving a plurality of digital images from a second image provider via the Internet;

storing a high resolution and a low resolution copy of each of the second plurality of digital images provided by the second image provider in an electronically searchable format on the storage device;

permitting a first authorized user identified by the first image provider to locate and download a low resolution copy of at least one of the digital images provided by the first image provider, the second plurality of digital images being transparent to the first authorized user;

receiving a request from the first authorized user, the request identifying at least one digital image;

receiving instructions from the first authorized user directing that the at least one digital image be printed; and automatically electronically routing the high resolution copy of the at least one digital image to a printer.

18. A method as defined in claim 17 wherein the first image provider is a user identified by the first image provider.

19. A method as defined in claim 17 wherein a user different from the first image provider is a user identified by the first image provider.

20. A digital image management and delivery system comprising:

a storage device for storing digital images received via the Internet from a first digital image provider and a second digital image provider;

a searching engine for developing a subset of the digital images stored in the storage device in response to inputs received from a first user, the searching engine being adapted to download low resolution copies of the subset to the first user;

a job order developer responsive to inputs received from the first user for developing a job order which includes at least one high resolution copy of a digital image contained in the subset and identified by the first user;

a router for electronically routing the job order developed by the job order developer to a printer; and a user identifier for discriminating between users communicating with the system to control user access to the digital images stored in the storage device, the user identifier limiting access to the digital images provided by the first digital image provider to at least one user identified by the first digital image provider, wherein the digital images provided by the first digital image provider are transparent to all users except users identified by the first digital image provider.

21. A digital image management system as defined in claim 20 wherein the first image provider is an authorized user identified by the first image provider.

22. A digital image management system as defined in claim 20 wherein a user different from the first image provider is an authorized user identified by the first image provider.

23. A digital image management and delivery system comprising:

a storage device for storing digital images received via the internet from a first digital image provider and a second digital image provider;

a searching engine for developing a subset of the digital images stored in the storage device in response to inputs received from a first user, the searching engine being adapted to download low resolution copies of the subset to the first user;

a router for electronically routing at least one high resolution copy of a digital image contained in the subset and identified by the first user to a printer; and a user identifier for discriminating between users communicating with the system to control user access to the digital images stored in the storage device, the user identifier limiting access to the digital images provided by the first digital image provider to at least one user identified by the first digital image provider, wherein the digital images provided by the first digital image provider are transparent to all users except users identified by the first digital image provider.

24. A digital image management system as defined in claim 23 wherein the first image provider is an authorized user identified by the first image provider.

25. A digital image management system as defined in claim 23 wherein a user different from the first image provider is an authorized user identified by the first image provider.

* * * * *